(12) United States Patent
Nam et al.

(10) Patent No.: US 10,979,132 B2
(45) Date of Patent: Apr. 13, 2021

(54) ORGANIZATION OF INTER-RELAY DISCOVERY REFERENCE SIGNALS

(71) Applicant: QUALCOMM Incorporated, San Diego, CA (US)

(72) Inventors: Wooseok Nam, San Diego, CA (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 78 days.

(21) Appl. No.: 16/533,021

(22) Filed: Aug. 6, 2019

(65) Prior Publication Data

US 2020/0052775 A1 Feb. 13, 2020

Related U.S. Application Data

(60) Provisional application No. 62/717,688, filed on Aug. 10, 2018.

(51) Int. Cl.
*H04B 7/155* (2006.01)
*H04B 17/318* (2015.01)
(Continued)

(52) U.S. Cl.
CPC ....... *H04B 7/15592* (2013.01); *H04B 17/318* (2015.01); *H04B 17/336* (2015.01); *H04L 5/005* (2013.01); *H04W 88/04* (2013.01)

(58) Field of Classification Search
None
See application file for complete search history.

(56) References Cited

U.S. PATENT DOCUMENTS

| 2008/0080436 A1* | 4/2008 | Sandhu | H04W 52/241 370/338 |
| 2012/0218886 A1* | 8/2012 | Van Phan | H04W 72/1252 370/229 |

(Continued)

FOREIGN PATENT DOCUMENTS

GB  2498559 A  7/2013

OTHER PUBLICATIONS

International Search Report and Written Opinion—PCT/US2019/045590—ISA/EPO—dated Nov. 12, 2019.

(Continued)

*Primary Examiner* — Adnan Baig
(74) *Attorney, Agent, or Firm* — QUALCOMM Incorporated

(57) ABSTRACT

Methods, systems, and devices for wireless communications are described. Some wireless communications systems may implement an integrated access and backhaul (IAB) network architecture where relay nodes connect with other IAB nodes via wireless backhaul links. For improved node discovery, during or after an initial relay integration procedure with a parent node, a relay node may transmit a capability report to the parent node indicating a duplexing capability of the relay node (e.g., whether the relay node is half-duplex or full-duplex capable). Based on the duplexing capability, the parent node may determine discovery reference signal (DRS) transmission and measurement resources for the relay node and configure the relay node with these resources. The relay node may use these resources for transmitting DRSs and monitoring for DRSs from other IAB nodes. If the relay node discovers another IAB node in the network, the nodes may form a wireless backhaul link.

30 Claims, 21 Drawing Sheets

(51) Int. Cl.
*H04W 88/04* (2009.01)
*H04L 5/00* (2006.01)
*H04B 17/336* (2015.01)

(56) References Cited

U.S. PATENT DOCUMENTS

| | | | | |
|---|---|---|---|---|
| 2013/0201903 A1* | 8/2013 | Takahashi | ............ | H04W 16/26 |
| | | | | 370/315 |
| 2018/0159584 A1* | 6/2018 | Zhang | ................. | H04L 5/0082 |
| 2018/0205533 A1* | 7/2018 | Lee | ..................... | H04L 5/1461 |
| 2018/0270644 A1* | 9/2018 | Koorapaty | ............ | H04W 48/12 |
| 2020/0044732 A1* | 2/2020 | Cui | ...................... | H04W 76/50 |

OTHER PUBLICATIONS

ZTE: "Discussion on Measurements and RS Design for CLI Mitigation", 3GPP TSG RAN WG1 Meeting #89, 3GPP Draft; R1-1707204-7.1.6.1 Measurement and RS Design for CLI, 3rd Generation Partnership Project (3GPP), Mobile Competence Centre, 650, Route Des Lucioles, F-06921 Sophia-Antipolis Cedex, France, vol. RAN WG1, No. Hangzhou; May 15-19, 2017, May 14, 2017 (May 14, 2017), 9 Pages, XP051272419, Retrieved from the Internet: URL: http://www.3gpp.org/ftp/Meetings_3GPP_SYNC/RAN1/Docs/ [retrieved on May 14, 2017] paragraph [0001]—paragraph [05 .1] paragraph [06 .1] paragraph [0007].

ZTE: "TRP-to-TRP Measurement as an Enabler for CLI Mitigation Schemes", 3GPP TSG RAN WG1 Meeting #90, 3GPP Draft; R1-1712283-6.1.5.2 TRP-to-TRP Measurement for CLI Mitigation, 3rd Generation Partnership Project (3GPP), Mobile Competence Centre; 650, Route Des Lucioles; F-06921 Sophia-Antipolis Cedex, vol. RAN WG1, No. Prague, Czech Republic; Aug. 21-25, 2017, Aug. 20, 2017 (Aug. 20, 2017), 6 Pages, XP051315099, Retrieved from the Internet: URL: http://www.3gpp.org/ftp/Meetings_3GPP_SYNC/RAN1/Docs/ [retrieved on Aug. 20, 2017] paragraph [0002]—paragraph [2.2.3].

* cited by examiner

500

ORGANIZATION OF INTER-RELAY DISCOVERY REFERENCE SIGNALS

CROSS REFERENCE

The present Application for Patent claims the benefit of U.S. Provisional Patent Application No. 62/717,688 by NAM, et al., entitled "ORGANIZATION OF INTER-RELAY DISCOVERY REFERENCE SIGNALS," filed Aug. 10, 2018, assigned to the assignee hereof, and expressly incorporated by reference herein.

BACKGROUND

The present disclosure relates generally to wireless communications, and to organization of inter-relay discovery reference signals (DRSs).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems may implement an integrated access and backhaul (IAB) network architecture. An IAB network may include relay nodes and anchor nodes connected via wireless backhaul links. In some cases, relay nodes may perform discovery procedures to attempt to detect additional nodes within the network for wireless backhauling. During discovery procedures, relay nodes may transmit DRSs, and also monitor for DRSs from other relay nodes. However, in some cases, multiple relay nodes may transmit DRSs at the same time. As such, the DRSs may interfere with one another and result in failed detection for the nodes. Additionally, if a first node cannot transmit and receive DRSs simultaneously, transmitting a DRS at the same time as another node may preclude the first node from receiving the DRS from the other node. This may increase the latency and result in inefficiencies in the relay node discovery process.

SUMMARY

The described techniques relate to improved methods, systems, devices, and apparatuses that support organization of inter-relay discovery reference signals (DRSs). Generally, the described techniques provide for improved node discovery in an integrated access and backhaul (IAB) network. The IAB network may include anchor nodes and relay nodes providing access to a core network. The relay nodes may transmit and monitor for DRSs to discover other nodes in the system and may form wireless backhaul links with any discovered nodes. To improve the efficiency and reduce the latency of node discovery (e.g., inter-relay discovery), during or after an initial relay integration procedure with a parent node, a relay node may transmit a capability report to the parent node indicating a duplexing capability of the relay node (e.g., whether the relay node is capable of half-duplex or full-duplex operation). Based on the duplexing capability, the parent node may determine DRS transmission and measurement resources for the relay node and may configure the relay node with these resources. The relay node may use these resources for transmitting DRSs and monitoring for DRSs from other IAB nodes. For example, half-duplex relay nodes may be configured with non-overlapping (i.e., non-overlapping in time) DRS transmission resources and DRS measurement resources so that the half-duplex relay node may transmit and receive DRSs at separate times. In contrast, full-duplex relay nodes may be configured with simultaneous (e.g., fully or partially overlapping in time) DRS transmission resources and DRS measurement resources so that the full-duplex relay node may transmit and receive DRSs simultaneously. If a relay node discovers another IAB node in the IAB network, the two nodes may form a wireless backhaul link. These additional links may improve the robustness and redundancy of backhaul communications in the IAB network.

A method for wireless communication at a relay node of a wireless communications system is described. The method may include transmitting, to a parent node of the wireless communications system, a report indicating a duplexing capability of the relay node, receiving, from the parent node, a configuration that identifies DRS transmission resources and DRS measurement resources for the relay node in accordance with the indicated duplexing capability of the relay node, transmitting a DRS using the identified DRS transmission resources, and monitoring for DRSs from other nodes of the wireless communications system using the identified DRS measurement resources.

An apparatus for wireless communication at a relay node of a wireless communications system is described. The apparatus may include a processor, memory coupled with the processor, and instructions stored in the memory. The instructions may be operable, when executed by the processor, to cause the apparatus to transmit, to a parent node of the wireless communications system, a report indicating a duplexing capability of the relay node, receive, from the parent node, a configuration that identifies DRS transmission resources and DRS measurement resources for the relay node in accordance with the indicated duplexing capability of the relay node, transmit a DRS using the identified DRS transmission resources, and monitor for DRSs from other nodes of the wireless communications system using the identified DRS measurement resources.

Another apparatus for wireless communication at a relay node of a wireless communications system is described. The apparatus may include means for transmitting, to a parent node of the wireless communications system, a report indicating a duplexing capability of the relay node, receiving, from the parent node, a configuration that identifies DRS transmission resources and DRS measurement resources for the relay node in accordance with the indicated duplexing capability of the relay node, transmitting a DRS using the identified DRS transmission resources, and monitoring for DRSs from other nodes of the wireless communications system using the identified DRS measurement resources.

A non-transitory computer-readable medium storing code for wireless communication at a relay node of a wireless communications system is described. The code may include instructions executable by a processor to transmit, to a parent node of the wireless communications system, a report indicating a duplexing capability of the relay node, receive, from the parent node, a configuration that identifies DRS transmission resources and DRS measurement resources for the relay node in accordance with the indicated duplexing capability of the relay node, transmit a DRS using the identified DRS transmission resources, and monitor for DRSs from other nodes of the wireless communications system using the identified DRS measurement resources.

In some examples of the method, apparatuses, and non-transitory computer-readable medium described herein, the transmitted report indicates that the duplexing capability of the relay node includes a full duplexing capability, and the DRS transmission resources for the relay node to use to transmit the DRS include a same transmission time interval as the DRS measurement resources for the relay node to use to monitor for the DRSs from other relay nodes of the wireless communications system. In other examples of the method, apparatuses, and non-transitory computer-readable medium described herein, the transmitted report indicates that the duplexing capability of the relay node includes a half duplexing capability, and the DRS transmission resources for the relay node to use to transmit the DRS include a first transmission time interval and the DRS measurement resources for the relay node to use to monitor for the DRSs from other nodes include a second transmission time interval.

Some examples of the method, apparatuses, and non-transitory computer-readable medium described herein may further include operations, features, means, or instructions for transmitting, to the parent node, a report indicating a quality of a wireless backhaul link with the parent node or with a second relay node of the wireless communications system and receiving, in response to the transmitted report indicating the quality of the wireless backhaul link, a second configuration that identifies refined DRS transmission resources, or refined DRS measurement resources, or a combination thereof for the relay node.

In some examples of the method, apparatuses, and non-transitory computer-readable medium described herein, the report indicating the quality of the wireless backhaul link may be transmitted periodically, or semi-statically, or aperiodically, or in response to a trigger. In some examples of the method, apparatuses, and non-transitory computer-readable medium described herein, the report indicating the quality of the wireless backhaul link indicates a reference signal received power (RSRP), or a signal to interference noise ratio (SINR), or a rank of the wireless backhaul link, or a self-interference strength, or a combination thereof.

In some examples of the method, apparatuses, and non-transitory computer-readable medium described herein, transmitting the report indicating the duplexing capability of the relay node may include operations, features, means, or instructions for transmitting the report indicating a set of duplexing capabilities of the relay node, where the set of duplexing capabilities includes at least the duplexing capability.

In some examples of the method, apparatuses, and non-transitory computer-readable medium described herein, transmitting the DRS using the identified DRS transmission resources may include operations, features, means, or instructions for transmitting the DRS in a DRS burst set using a transmit beam sweep.

Some examples of the method, apparatuses, and non-transitory computer-readable medium described herein may further include operations, features, means, or instructions for measuring an RSRP, or an SINR, or a self-interference strength, or a combination thereof and reordering, based on the measurement, an order of transmit beams used for the transmit beam sweep. Some examples of the method, apparatuses, and non-transitory computer-readable medium described herein may further include operations, features, means, or instructions for receiving, from the parent node, an indication of an order of transmit beams used for the transmit beam sweep.

In some examples of the method, apparatuses, and non-transitory computer-readable medium described herein, receiving the configuration that identifies DRS transmission resources and DRS measurement resources may include operations, features, means, or instructions for receiving a DRS group identifier and identifying the DRS transmission resources and the DRS measurement resources based on the received DRS group identifier.

In some examples of the method, apparatuses, and non-transitory computer-readable medium described herein, receiving the configuration that identifies DRS transmission resources and DRS measurement resources may include operations, features, means, or instructions for receiving the configuration via radio resource control signaling, or a medium access control (MAC) control element, or a combination thereof.

In some examples of the method, apparatuses, and non-transitory computer-readable medium described herein, the report indicating the duplexing capability of the relay node may be transmitted during an initial integration procedure for the relay node that establishes a wireless backhaul link with the parent node. In other examples of the method, apparatuses, and non-transitory computer-readable medium described herein, the report indicating the duplexing capability of the relay node may be transmitted after a wireless backhaul link with the parent node may be established.

In some examples of the method, apparatuses, and non-transitory computer-readable medium described herein, the report indicating the duplexing capability of the relay node further includes a level of self-interference cancellation for the relay node.

In some examples of the method, apparatuses, and non-transitory computer-readable medium described herein, the DRS includes at least a portion of a synchronization signal block, or a channel state information reference signal, or a tracking reference signal.

A method for wireless communication at a parent node of a wireless communications system is described. The method may include receiving, from a relay node of the wireless communications system, a report indicating a duplexing capability of the relay node, determining DRS transmission resources and DRS measurement resources for the relay node based on the indicated duplexing capability of the relay node, and transmitting, to the relay node, a configuration that identifies the determined DRS transmission resources and the determined DRS measurement resources.

An apparatus for wireless communication at a parent node of a wireless communications system is described. The apparatus may include a processor, memory coupled with the processor, and instructions stored in the memory. The instructions may be operable, when executed by the processor, to cause the apparatus to receive, from a relay node of the wireless communications system, a report indicating a duplexing capability of the relay node, determine DRS transmission resources and DRS measurement resources for the relay node based on the indicated duplexing capability of the relay node, and transmit, to the relay node, a configuration that identifies the determined DRS transmission resources and the determined DRS measurement resources.

Another apparatus for wireless communication at a parent node of a wireless communications system is described. The apparatus may include means for receiving, from a relay node of the wireless communications system, a report indicating a duplexing capability of the relay node, determining DRS transmission resources and DRS measurement resources for the relay node based on the indicated duplexing capability of the relay node, and transmitting, to the relay node, a configuration that identifies the determined DRS transmission resources and the determined DRS measurement resources.

A non-transitory computer-readable medium storing code for wireless communication at a parent node of a wireless communications system is described. The code may include instructions executable by a processor to receive, from a relay node of the wireless communications system, a report indicating a duplexing capability of the relay node, determine DRS transmission resources and DRS measurement resources for the relay node based on the indicated duplexing capability of the relay node, and transmit, to the relay node, a configuration that identifies the determined DRS transmission resources and the determined DRS measurement resources.

In some examples of the method, apparatuses, and non-transitory computer-readable medium described herein, determining the DRS transmission resources and the DRS measurement resources may include operations, features, means, or instructions for identifying that the received report indicates that the duplexing capability of the relay node is a full duplexing capability and determining the DRS transmission resources for the relay node to use to transmit a DRS include a same transmission time interval as the DRS measurement resources for the relay node to use to monitor for DRSs from other relay nodes. In other examples of the method, apparatuses, and non-transitory computer-readable medium described herein, determining the DRS transmission resources and the DRS measurement resources may include operations, features, means, or instructions for identifying that the received report indicates that the duplexing capability of the relay node is a half duplexing capability and determining the DRS transmission resources for the relay node to use to transmit the DRS include a first transmission time interval and the DRS measurement resources for the relay node to use to monitor for the DRSs from other nodes include a second transmission time interval.

Some examples of the method, apparatuses, and non-transitory computer-readable medium described herein may further include operations, features, means, or instructions for receiving, from the relay node, a report indicating a quality of a wireless backhaul link with the parent node or with a second relay node of the wireless communications system, determining refined DRS transmission resources, or refined DRS measurement resources, or a combination thereof for the relay node based on the received report indicating the quality of the wireless backhaul link and transmitting, to the relay node, a second configuration that identifies the refined DRS transmission resources, or the refined DRS measurement resources, or the combination thereof for the relay node.

In some examples of the method, apparatuses, and non-transitory computer-readable medium described herein, the report indicating the quality of the wireless backhaul link may be transmitted periodically, or semi-statically, or aperiodically, or in response to a trigger. In some examples of the method, apparatuses, and non-transitory computer-readable medium described herein, the report indicating the quality of the wireless backhaul link indicates an RSRP, or an SINR, or a rank of the wireless backhaul link, or a self-interference strength, or a combination thereof.

Some examples of the method, apparatuses, and non-transitory computer-readable medium described herein may further include operations, features, means, or instructions for transmitting, to the relay node, an indication of an order of transmit beams for the relay node to use to transmit a DRS burst set using a transmit beam sweep.

Some examples of the method, apparatuses, and non-transitory computer-readable medium described herein may further include operations, features, means, or instructions for assigning the relay node to a DRS group that includes a first set of relay nodes, where the determined DRS transmission resources and the determined DRS measurement resources may be common to the first set of relay nodes.

In some examples of the method, apparatuses, and non-transitory computer-readable medium described herein, transmitting the configuration that identifies the determined DRS transmission resources and the determined DRS measurement resources may include operations, features, means, or instructions for transmitting a DRS group identifier for the DRS group that identifies the determined DRS transmission resources and the determined DRS measurement resources.

Some examples of the method, apparatuses, and non-transitory computer-readable medium described herein may further include operations, features, means, or instructions for assigning a second relay node to a second DRS group that includes a second set of relay nodes and determining second DRS transmission resources and second DRS measurement resources for the second set of relay nodes different from the determined DRS transmission resources, or the determined DRS measurement resources, or a combination thereof for the first set of relay nodes.

In some examples of the method, apparatuses, and non-transitory computer-readable medium described herein, the relay node may be assigned to the DRS group based on the duplexing capability of the relay node, or a location of the relay node, or a level of interference between the relay node and a second relay node, or a self-interference strength of the relay node, or a combination thereof. In some examples of the method, apparatuses, and non-transitory computer-readable medium described herein, at least two of the relay nodes of the DRS group may have different control resources, or data resources, or a combination thereof.

In some examples of the method, apparatuses, and non-transitory computer-readable medium described herein, transmitting the configuration that identifies the determined DRS transmission resources and the determined DRS measurement resources may include operations, features, means, or instructions for transmitting the configuration via radio resource control signaling, or a medium access control (MAC) control element, or a combination thereof.

In some examples of the method, apparatuses, and non-transitory computer-readable medium described herein, the report indicating the duplexing capability of the relay node may be received during an initial integration procedure for the relay node that establishes a wireless backhaul link with the parent node. In other examples of the method, apparatuses, and non-transitory computer-readable medium described herein, the report indicating the duplexing capability of the relay node may be received after a wireless backhaul link with the parent node may be established.

In some examples of the method, apparatuses, and non-transitory computer-readable medium described herein, the report indicating the duplexing capability of the relay node further includes a level of self-interference cancellation for the relay node.

DETAILED DESCRIPTION

Figure 1:
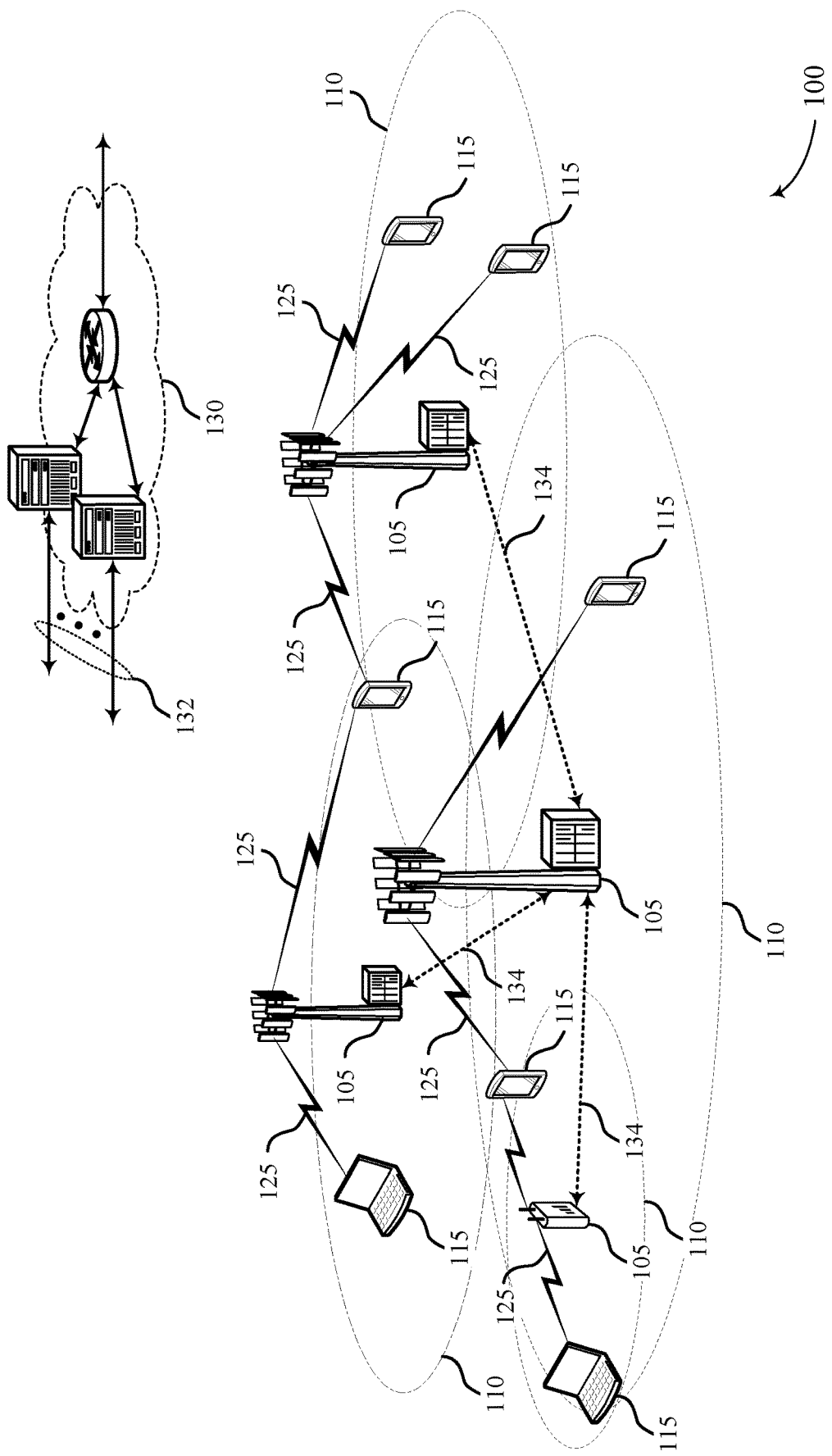
FIGS. 1 through 4 illustrate examples of wireless communications systems that support organization of inter-relay discovery reference signals (DRSs) in accordance with aspects of the present disclosure.

A wireless communications system (e.g., a New Radio (NR) system, a millimeter wave (mmW) system, etc.) may implement an integrated access and backhaul (IAB) network architecture. An IAB network may include a number of connected nodes to support network coverage, for example for a large geographic area. These IAB nodes may generally be referred to as base stations. A subset of these nodes may be donor or "anchor" nodes. An anchor node may be connected to the core network via a wireline backhaul connection. Additionally, the anchor node may connect to one or more "relay" nodes distributed throughout the IAB network via one or more wireless backhaul connections. These relay nodes may not be physically connected to the network with a wireline link, and instead may relay communications between user equipment (UEs) and anchor nodes using wireless backhaul links. UEs within the network coverage area may access the network via access links, where each access link supports communications between a UE and an IAB node (e.g., an anchor node or a relay node).

When a relay node is added to the IAB network, the relay node may perform an initial integration procedure to connect with an IAB node within the network. The relay node may form a wireless backhaul link with this IAB node and may send and/or receive backhaul messages over the link. In these cases, the relay node may be referred to as a "child" node, and the connected IAB node may be a "parent" node for the relay node. The parent node may transmit information from the core network downstream to the relay node, and the relay node may forward information received from UEs upstream to the parent node. In some cases, the parent node may be an example of an anchor node and may communicate with the core network directly (e.g., via a wireline link). In other cases, the parent node may be another relay node, and may itself be connected to an additional parent node. In this way, the IAB system may form chains of relay nodes (e.g., to support wide network coverage despite small cell nodes).

During or following the initial integration procedure for a relay node, the relay node may attempt to discover additional IAB nodes (e.g., additional relay nodes or anchor nodes) for wireless backhaul connections. Forming additional wireless backhaul connections may improve the robustness of the IAB network and improve the reliability of backhaul communications. To discover other IAB nodes for backhaul connections, a relay node may transmit and monitor for discovery reference signals (DRSs). Relay nodes that are capable of half-duplexing operation—but not full-duplexing operation—may transmit DRSs and monitor for DRSs in separate transmission time intervals (TTIs) (e.g., because the relay nodes may not support simultaneous transmission and reception). Relay nodes that are capable of full-duplexing operation may monitor for DRSs in the same TTIs that they transmit DRSs. Such TTIs may include the same TTI, sTTI, frame, subframe, slot, or other time resource allocated for the transmission and/or measurement of DRSs.

To efficiently organize the discovery process, a relay node may transmit a capability report to a parent node, the capability report indicating the duplexing capability of the relay node. The parent node may determine DRS resources for the relay node based on the indicated duplexing capability, where the DRS resources may identify time and/or frequency resources for DRS transmission (i.e., DRS transmission resources), time and/or frequency resources for DRS monitoring (i.e., DRS measurement resources), or both. Alternatively, the parent node may relay the capability report upstream in the IAB network, and the core network or an anchor node may determine the DRS resources. In some cases, determining the DRS resources may involve assigning the relay node to a DRS group, where each DRS group corresponds to a set of DRS resources. The parent node may transmit a configuration for discovery to the relay node, where the configuration may indicate the determined DRS resources (e.g., using an explicit indication or using a DRS group identifier (ID)). The relay node may then perform discovery according to the received configuration. For example, the relay node may transmit and monitor for DRS during the indicated resources.

If the relay node detects and receives a DRS from another IAB node (e.g., during a DRS monitoring procedure), and/or if the other IAB node receives a DRS from the relay node, these two nodes may form a wireless backhaul link. By determining DRS resources at a parent and/or anchor node, the system may assign DRS resources based on duplexing capabilities, interference levels, geographic locations, or some combination of these, for the relay node. As such, the discovery operations may be organized such that relay nodes may effectively monitor (e.g., measure) while nearby relay nodes are transmitting DRSs, and the relay node may transmit one or more DRSs while nearby relay nodes are effectively monitoring. This may improve the latency of the discovery procedure while also increasing the reliability of discovering useful wireless backhaul links.

Relay nodes may additionally transmit backhaul link quality reports to parent nodes. Information in these reports may be used to further refine and improve the discovery processes at the relay nodes. Additionally, if relay nodes transmit DRSs in DRS burst sets using transmit beam sweeping, the relay nodes may rearrange the order of transmit beams in the beam sweep to increase the discovery of other IAB nodes.

Aspects of the disclosure are initially described in the context of wireless communications systems and IAB networks. Further aspects of the disclosure are described with respect to DRS timeline, a beam rearrangement procedure, and a process flow. Aspects of the disclosure are further illustrated by and described with reference to apparatus diagrams, system diagrams, and flowcharts that relate to organization of inter-relay discovery reference signals.

FIG. 1 illustrates an example of a wireless communications system 100 that supports organization of inter-relay discovery reference signals in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200 \, T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

The wireless communications system 100 (e.g., an NR system, a mmW system, etc.) may implement an IAB network architecture. An IAB network may include relay nodes and anchor nodes connected via wireless backhaul links 134. For example, base stations 105 may be examples of IAB nodes, where the base stations 105 connected to the core network 130 via a wireline backhaul link 132 may be examples of donor or anchor nodes, and the base stations 105 not connected to the core network 130 with a wireline backhaul link 132 (e.g., and instead connected to other base stations 105 with wireless backhaul links 134) may be examples of relay nodes. In some cases, relay nodes may perform discovery procedures to attempt to detect additional nodes within the network for wireless backhauling. During discovery procedures, relay nodes may transmit DRSs, and also monitor for DRSs from other relay nodes.

To efficiently organize the discovery process, a relay node may transmit a capability report to a parent node, the capability report indicating the duplexing capability of the relay node. The parent node may determine DRS resources (e.g., DRS transmission and DRS measurement resources) for the relay node based on the indicated duplexing capability, where the DRS resources may identify time and/or frequency resources for DRS transmission, time and/or frequency resources for DRS monitoring, or both. Alternatively, the parent node may relay the capability report upstream in the IAB network, and the core network 130 or an anchor node may determine the DRS resources. In some cases, determining the DRS resources may involve assigning the relay node to a DRS group, where each DRS group corresponds to a set of DRS resources. The parent node may transmit a configuration for discovery to the relay node, where the configuration may indicate the determined DRS resources (e.g., using an explicit indication or using a DRS group ID). The relay node may then perform discovery according to the received configuration. For example, the relay node may transmit DRSs during the indicated DRS transmission resources and may monitor for DRSs during the indicated DRS measurement resources.

If the relay node detects and receives a DRS from another IAB node (e.g., during a DRS monitoring procedure), and/or if the other IAB node receives a DRS from the relay node, these two nodes may form a wireless backhaul link 134. By determining DRS resources at a parent and/or anchor node, the wireless communications system 100 may assign DRS resources based on duplexing capabilities, interference levels, geographic locations, or some combination of these, for the relay node. As such, the discovery operations may be organized such that relay nodes may effectively monitor (e.g., measure) while nearby relay nodes are transmitting DRSs, and the relay node may transmit one or more DRSs while nearby relay nodes are effectively monitoring. This may improve the latency of the discovery procedure while also increasing the reliability of discovering useful wireless backhaul links 134.

Relay nodes may additionally transmit backhaul link quality reports to parent nodes. Information in these reports may be used to further refine and improve the discovery processes at the relay nodes. Additionally, if relay nodes transmit DRSs in DRS burst sets using transmit beam sweeping, the relay nodes may rearrange the order of transmit beams in the beam sweep to increase the discovery of other IAB nodes.

Figure 2:
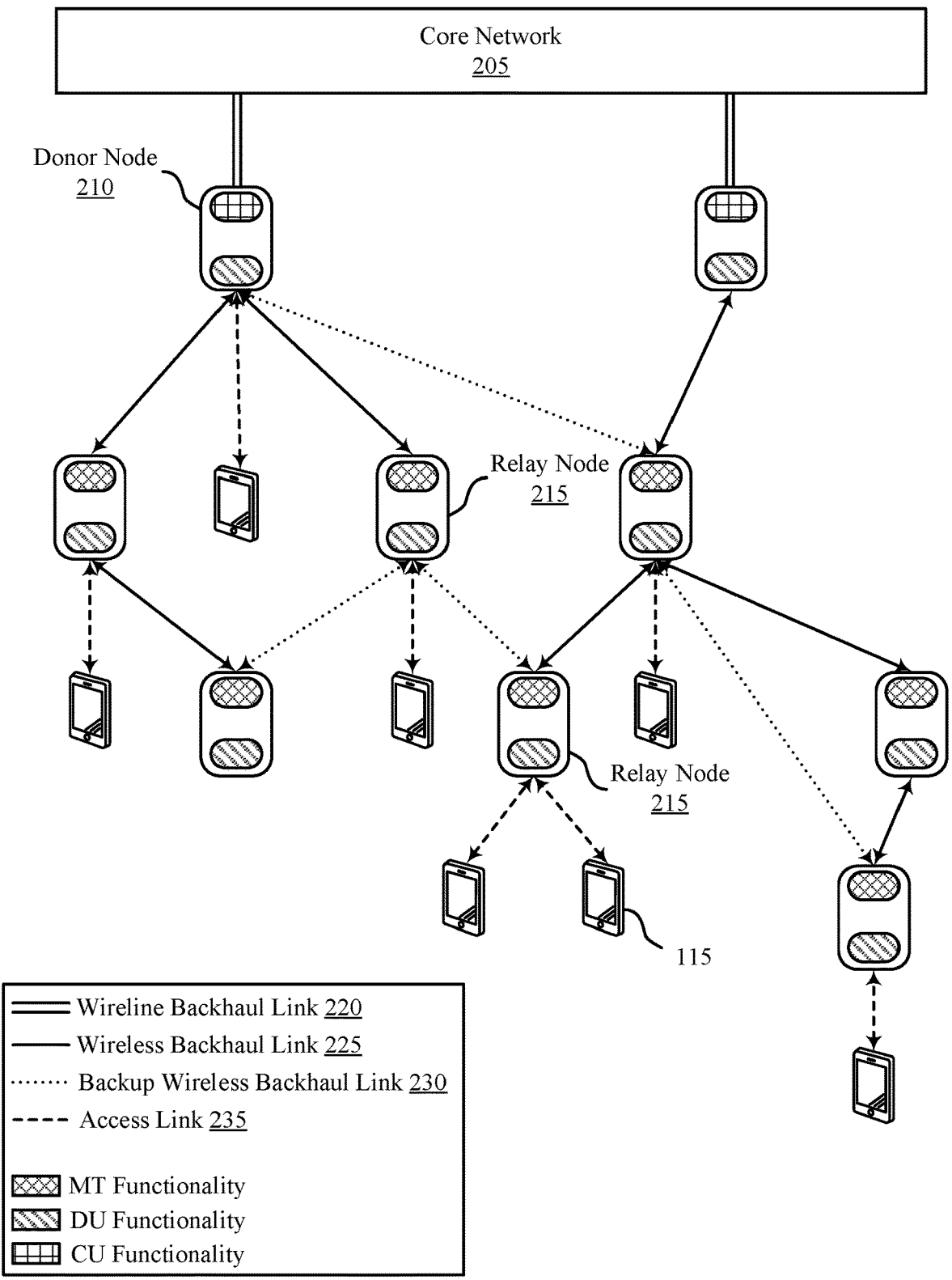

FIG. 2 illustrates an example of a wireless communications system 200 that supports organization of inter-relay DRSs in accordance with aspects of the present disclosure. Wireless communications system 200 (e.g., an NR system, a millimeter wave (mmW) system, etc.) may supplement wireline backhaul connections (e.g., wireline backhaul links 220) by sharing infrastructure and spectral resources for network access with wireless backhaul link capabilities, providing an integrated access and backhaul (IAB) network architecture. Wireless communications system 200 may include a core network 205 and base stations 105 or supported devices split into one or more support entities (i.e., functionalities) for promoting wireless backhaul density in collaboration with communication access. Aspects of the supporting functionalities of the base stations 105 may be referred to as IAB nodes, such as IAB donor nodes 210 and IAB relay nodes 215. Wireless communications system 200 may additionally support a number of UEs 115, which may communicate on the uplink with one or more IAB donor nodes 210, IAB relay nodes 215, or a combination of these devices. In some examples, wireless communications system 200 may implement aspects of wireless communications system 100.

Wireless communications system 200 may include one or more IAB donor nodes 210, which may interface between a wireline network and a wireless network. In some cases, an IAB donor node 210 may be referred to as an anchor node, as the IAB donor node 210 anchors the wireless network to a wireline connection. For example, each IAB donor node 210 may include at least one wireline backhaul link 220 and one or more additional links (e.g., wireless backhaul links 225, backup wireless backhaul links 230, access links 235, etc.). An IAB donor node 210 may be split into associated base station centralized unit (CU) and distributed unit (DU) entities, where one or more DUs associated with an IAB donor node 210 may be partially controlled by an associated CU. CUs of IAB donor nodes 210 may host layer 3 (L3) (e.g., RRC, service data adaption protocol (SDAP), packet data convergence protocol (PDCP), etc.) functionality and signaling. Furthermore, CUs of IAB donor nodes 210 may communicate with the core network 205 over a wireline backhaul link 220 (e.g., which may be referred to as an NG interface). DUs may host lower layer operations, such as layer 1 (L1) and/or layer 2 (L2) (e.g., radio link control (RLC), MAC, physical (PHY) layer, etc.) functionality and signaling. One example of such signaling may be MAC signaling such a MAC control element (CE). A DU entity of an IAB donor node 210 may support a serving cell within the network coverage area according to connections associated with wireless backhaul links 225 and access links 235 of the IAB network. DUs of the IAB donor nodes 210 may control both access and backhaul links within the corresponding network coverage and may provide controlling and scheduling for descendant (i.e., child) IAB relay nodes 215 and or UEs 115. For example, a DU may support an RLC channel connection with a UE 115 (e.g., via an access link 235) or with an IAB relay node 215 (e.g. via a backhaul link, such as a primary wireless backhaul link 225 or a backup wireless backhaul link 230).

TAB relay nodes 215 may be split into associated mobile terminal (MT) and base station DU entities, where MT functionality of the IAB relay nodes 215 may be controlled and/or scheduled by antecedent (i.e., parent) IAB nodes via wireless backhaul links. A parent node to a relay node 215 may be another (antecedent) relay node 215 or a donor node 210. The MT functionality may be similar to functionality performed by UEs 115 in the system. An IAB relay node 215 may not be directly connected to a wireline backhaul 220. Instead, the IAB relay node 215 may connect to the core network 205 via other IAB nodes (e.g., any number of additional IAB relay nodes 215 and an IAB donor node 210) using wireless backhaul links. The IAB relay node 215 may transmit upstream (e.g., towards the core network 205) in the IAB system using MT functionality. The term "parent node" may refer to any node upstream of a corresponding "child" node in the wireless communications system 200. For example, a child node may communicate with the core network 205 via a chain of one or more parent nodes. In some cases, DUs of the IAB relay nodes 215 may be partially controlled by signaling messages from CU entities of an associated IAB donor node 210 (e.g., transmitted via an F1-application protocol (AP)). The DUs of the IAB relay nodes 215 may support serving cells of the network coverage area. For example, a DU of an IAB relay node 215 may perform the same or similar functions as a DU of an IAB donor node 210, supporting one or more access links 235 for UEs 115, one or more wireless backhaul links for downstream IAB relay nodes 215, or both.

Wireless communications system 200 may employ relay chains for communications within the IAB network architecture. For example, a UE 115 may communicate with an IAB node, and the IAB node may relay the data to a base station CU or the core network 205 either directly or via one or more IAB relay nodes 215. Each IAB relay node 215 may include a primary wireless backhaul link 225 for relaying data upstream and/or receiving information from a base station CU or the core network 205. In some cases, an IAB relay node 215 may additionally include one or more backup wireless backhaul links 230 (e.g., for redundant connectivity and/or improved robustness). If the primary wireless backhaul link 225 fails (e.g., due to interference, malfunction at a connected IAB node, movement of IAB nodes, maintenance at IAB nodes, etc.), an IAB relay node 215 may utilize a backup wireless backhaul link 230 for backhaul communication within the IAB network. The first (e.g., primary) wireless backhaul link 225 may be associated with a coverage area and MT functionality may be controlled and/or scheduled by a first parent node. The one or more secondary backhaul links (e.g., backup wireless backhaul links 230) may be associated with a non-collocated coverage area and controlled and/or scheduled by one or more parent nodes. Each of the primary backhaul connections and the one or more secondary connections may support spectral capabilities to provide network communication over one or more RATs. The one or more IAB nodes may further support base station DU entities and may support multiple backhaul and access links within the relay chain. The DU entities may control and/or schedule descendant IAB relay nodes 215 and UEs 115 within the IAB network (e.g., downstream in the IAB network) via the configured backhaul and access links. That is, an IAB relay node 215 may act as a relay between an IAB donor node 210 and one or more descendant devices (e.g., other IAB relay nodes 215, UEs 115, etc.) in both communication directions based on established backhaul and access connections.

The supported relay chain of wireless communications system 200, including multiple backhaul and access link connections between IAB donor nodes 210, IAB relay nodes 215, and UEs 115, may enhance backhaul density within the coverage areas supported by the network while achieving resource gains. That is, enhanced backhaul link coverage (i.e., increased backhaul links due to wireless backhaul on network access technology and resources) within the wireless communications system 200 may increase supported service capacity density within a coverage area. As a result, network capacity in terms of supported user capacity density may be improved, with enhanced utilization of the deployed backhaul spectrum.

In an mmW system, wireless backhaul within an IAB network may support high cell density to achieve effective area coverage. For example, because mmW access may be associated with high free space path loss, penetration loss, atmospheric absorption, or a combination of these inefficiencies, an mmW system may use a large number of mmW cells (e.g., IAB nodes) to support a full coverage area. Equipping each mmW cell with a wireline backhaul may be impractical from a setup, maintenance, and/or cost standpoint. As such, the mmW system may utilize wireless backhaul between the mmW cells (e.g., using short-range, beamformed links) to support a high-density deployment scenario. Wireless backhaul may be a cost-effective solution for high density deployment of IAB nodes to support small cell technologies, such as mmW access. In some cases, IAB nodes may be referred to as base stations 105. For example, an IAB donor node 210 may be referred to as a donor base station 105, and an IAB relay node 215 may be referred to as a relay base station 105. In some cases, relay base stations 105 may be designed with low complexity (e.g., as compared to donor base stations 105 or base station CUs), which may decrease the cost and maintenance associated with deploying such IAB networks.

In some cases, during deployment, setup, or startup of an IAB relay node 215 within the IAB network, the IAB relay node 215 may detect an upstream IAB node (e.g., another IAB relay node 215 or an IAB donor node 210). The IAB relay node 215 may perform an initial integration process with this upstream IAB node and may form a wireless backhaul link 225 with this upstream node. At this point, for improved robustness and redundancy, the IAB relay node 215 may search for additional IAB nodes in the system that may support additional wireless backhaul connections (e.g., backup wireless backhaul links 230). However, the other IAB nodes in the system may also perform discovery operations (e.g., to search for and detect the IAB relay node 215). Backhaul discovery may involve a first IAB node transmitting a discovery reference signal (DRS) and a second IAB node receiving the DRS. In some cases, the wireless communications system 200 may support organizing the discovery processes for IAB nodes in the system in order to mitigate interference between different DRS transmissions and improve the reliability and efficiency of the discovery procedure.

Figure 3:
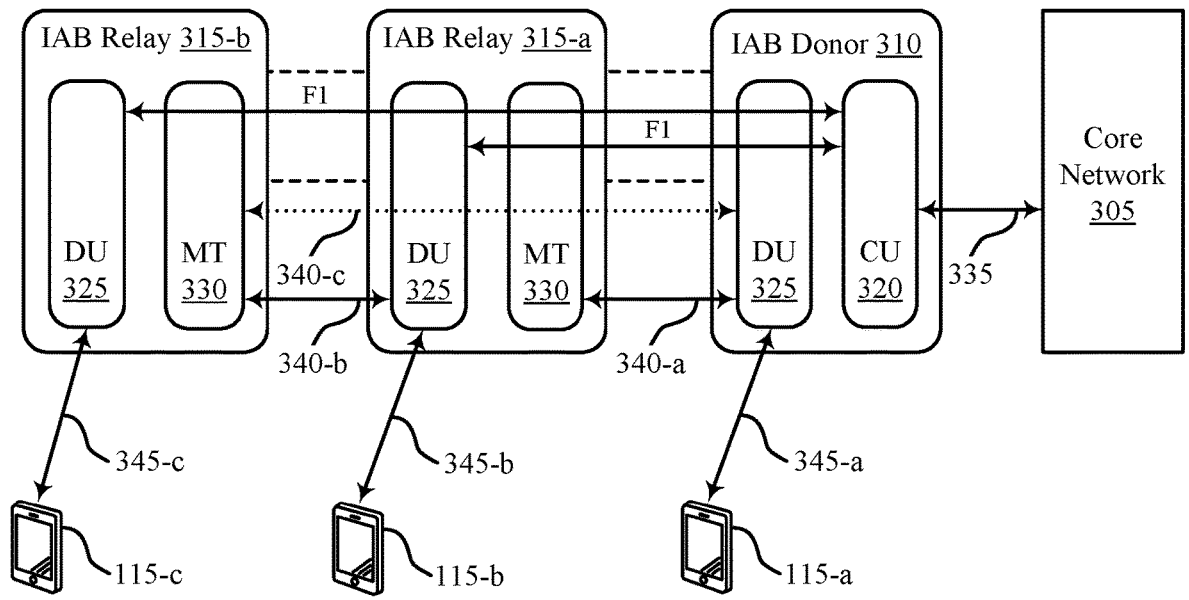

FIG. 3 illustrates an example of a wireless communications system 300 that supports organization of inter-relay DRSs in accordance with aspects of the present disclosure. Wireless communications system 300 may include a core network 305 (e.g., a 5G Next Generation Core (NGC)), an IAB donor node 310 (i.e., an IAB anchor node), IAB relay nodes 315, and UEs 115, where IAB relay nodes 315 may be partially controlled by each other and/or the IAB donor node 310. The IAB donor node 310 and IAB relay nodes 315 may be examples of aspects of base stations 105, and core network 305 may be an example of aspects of a core network 130, as described with reference to FIG. 1. Additionally, IAB donor node 310, IAB relay nodes 315, and core network 305 may be examples of the corresponding devices described with reference to FIG. 2. IAB donor node 310 and one or more IAB relay nodes 315 may be configured as (e.g., or in communication according to) a relay chain for backhaul communications.

An access network (AN) may refer to communications between access nodes (e.g., IAB donor node 310), IAB relay nodes 315-a and 315-b, and UEs 115. The IAB donor node 310 may facilitate connection between the core network 305 and the AN (e.g., via a wireline or wireless connection to the core network 305, such as connection 335). That is, an IAB donor node 310 may refer to a radio access network (RAN) node with a wireline or wireless connection to the core network 305. The IAB donor node 310 may include a CU 320 and at least one DU 325, where the CU 320 may communicate with the core network 305 over a connection 335, such as a backhaul link (e.g., a Next Generation (NG) interface). CU 320 may host L3 (e.g., RRC, SDAP, PDCP, etc.) functionality and signaling. DUs 325 may host lower layer functionality and signaling, such as L1 and L2 (e.g., RLC, MAC, PHY, etc.) functionality and signaling, and may each be at least partially controlled by CU 320. One example of such signaling may be a MAC CE. A DU 325 may support one or multiple different cells. IAB donor node 310 and IAB relay nodes 315-a and 315-b may communicate over an F1 interface according to some protocol that defines signaling messages (e.g., F1-AP protocol). Further, CU 320 may communicate with other CUs 320 (e.g., a CU associated with another IAB donor node not shown) over an inter-base station control plane (Xn-C) interface (which may be an example of or a portion of a connection 335, which may be a backhaul link in some examples).

IAB relay nodes 315 may refer to RAN nodes that provides IAB functionality (e.g., access for UEs 115, wireless self-backhauling capabilities, etc.). Each IAB relay node 315 may include a DU 325 and an MT 330. A DU 325 may act as a distributed scheduling node towards child nodes associated with the IAB relay node 315, and the MT 330 may act as a scheduled node towards parent nodes associated with the IAB relay node 315. That is, the DU 325 may perform base station-like functionality, while the MT 330 may perform UE-like functionality. An IAB donor node 310 may be referred to as a parent node in communication with one or more child nodes (e.g., an IAB donor node 310 may relay transmissions for UEs 115 through one or more other IAB relay nodes 315). Further, an IAB relay node 315 may also be referred to as a parent node or a child node to other IAB nodes, depending on the relay chain or configuration of the AN. Therefore, the MT entity of IAB nodes (e.g., MTs 330) may provide an interface (e.g., a UMTS terrestrial radio access network (UTRAN)-to-UE (Uu) interface, or an interface similar to a Uu interface) for a child node to receive signaling from a parent IAB node, and the DU entity (e.g., DUs 325) may provide a Uu interface for a parent node to signal to a child IAB relay node 315 or a UE 115. For example, DUs 325 may communicate with MTs 330 at IAB relay nodes 315 over wireless backhaul links 340, and DUs 325 may communicate with UEs 115 over access links 345.

As illustrated in FIG. 3, IAB relay node 315-a may be referred to as a parent node for IAB relay node 315-b and as a child node for IAB donor node 310. The IAB donor node 310 may include a CU 320 with a wireline (e.g., optical fiber) backhaul or wireless connection to the core network 305, and may act as parent node for IAB relay node 315-a and/or IAB relay node 315-b. For example, the DU 325 of IAB donor node 310 may relay transmissions to UEs 115 through IAB relay nodes 315-a and 315-b. The CU 320 of IAB donor node 310 may signal communication link establishment via an F1 interface to IAB relay nodes 315-a and 315-b, and the IAB relay nodes 315-a and 315-b may schedule transmissions (e.g., transmissions to the UEs 115 relayed from the IAB donor node 310) through their DUs 325. That is, data may be relayed between IAB donor node 310 and IAB relay nodes 315-a and 315-b via signaling over Uu interfaces (e.g., wireless backhaul links 340) to MTs 330 of the IAB relay nodes 315-a and 315-b. Communications with IAB relay node 315-a may be scheduled by DU 325 of the IAB donor node 310, and communications with IAB relay node 315-b may be scheduled by DU 325 of IAB relay node 315-a. In this way, communication between the base station CU 320 or core network 305 and a UE 115 may be relayed through any number of IAB nodes according to the relay chain configuration.

For example, data transmitted by UE 115-a may be received by IAB donor node 310 directly (e.g., via access link 345-a). However, data transmitted by UE 115-b may be relayed to IAB donor node 310 through IAB relay node 315-a (e.g., via access link 345-b and wireless backhaul link 340-a), and data transmitted by UE 115-c may be relayed to IAB donor node 310 through IAB relay node 315-b and IAB relay node 315-a (e.g., via access link 345-c, wireless backhaul link 340-b, and wireless backhaul link 340-a). Downlink transmissions may use similar IAB relay links. For example, IAB donor node 310 may transmit information to UE 115-c by first transmitting the information to IAB relay node 315-a (e.g., using the DU 325 of IAB donor node 310 and the MT 330 of IAB relay node 315-a). IAB relay node 315-a may then relay the information to IAB relay node 315-b (e.g., using the DU 325 of IAB relay node 315-a and the MT 330 of IAB relay node 315-b). Finally, IAB relay node 315-b may relay the information to UE 115-c using the DU 325 of IAB relay node 315-b.

In some cases, IAB relay node 315-b may perform discovery to identify additional IAB nodes for establishing wireless backhaul connections. Performing a discovery process may involve IAB relay node 315-b transmitting DRSs for other IAB nodes to detect as well as monitoring for DRSs from other IAB nodes. IAB relay node 315-b may transmit a capabilities report to IAB relay node 315-a indicating transmission and reception capabilities of IAB relay node 315-b. In some cases, based on this capabilities report, IAB relay node 315-a may schedule IAB relay node 315-b for discovery. For example, IAB relay node 315-a may transmit an indication of resources for IAB relay node 315-b to use for transmission and/or monitoring of DRSs (e.g., in an RRC configuration via wireless backhaul link 340-b). In other cases, IAB relay node 315-a may relay the capabilities report to IAB donor node 310, and the base station CU 320 or core network 350 may schedule IAB relay node 315-*b* for discovery. The scheduled resources may then be indicated to IAB relay node 315-*b* via IAB relay node 315-*a*.

IAB relay node 315-*b* may be scheduled for discovery such that DRSs transmitted by IAB relay node 315-*b* cause limited interference (e.g., no interference, or a level of interference below some dynamic or pre-determined threshold level of interference) with DRSs transmitted by other IAB nodes, such as IAB donor node 310. According to this organization of DRSs in the IAB network, IAB relay node 315-*b* may detect a DRS transmitted by IAB donor node 310, and/or IAB donor node 310 may detect a DRS transmitted by IAB relay node 315-*b*. Based on discovering the other IAB node, IAB relay node 315-*b* and IAB donor node 310 may perform a relay integration procedure and form a wireless backhaul link 340-*c* directly from the IAB donor node 310 to IAB relay node 315-*b*. In some cases, this wireless backhaul link 340-*c* may be an example of a secondary or backup wireless backhaul link for IAB relay node 315-*b*, where wireless backhaul link 340-*b* is the primary backhaul link for IAB relay node 315-*b*. As such, wireless backhaul link 340-*c* may provide robustness and/or redundancy for IAB relay node 315-*b* backhaul communications. In one example, IAB relay node 315-*b* may utilize wireless backhaul link 340-*c* for relaying information if IAB relay node 315-*a* is not functioning properly as a relay (e.g., due to interference at wireless backhaul links 340-*b* and/or 340-*a*, due to IAB relay node 315-*a* being temporarily offline, etc.). In a second example, IAB relay node 315-*b* may utilize both wireless backhaul link 340-*b* and wireless backhaul link 340-*c* for backhaul communications to improve the reliability of relaying information to the IAB donor node 310.

Figure 4:
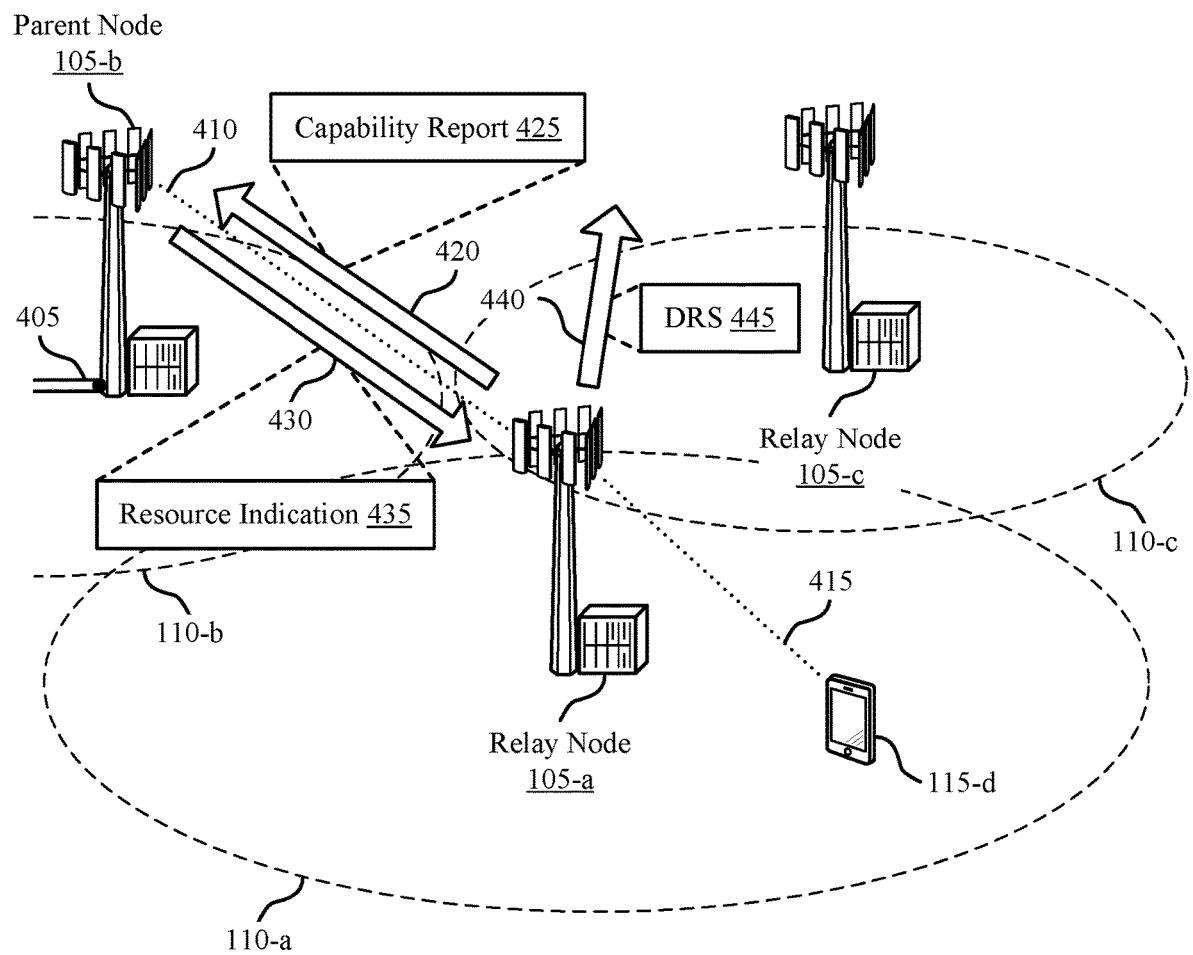

FIG. 4 illustrates an example of a wireless communications system 400 that supports organization of inter-relay DRSs in accordance with aspects of the present disclosure. The wireless communications system 400 may be an example of an IAB network and may include a number of base stations 105 providing network coverage for UEs 115. For example, base station 105-*a* provides network coverage for geographic coverage area 110-*a*, base station 105-*b* provides network coverage for geographic coverage area 110-*b*, and base station 105-*c* provides network coverage for geographic coverage area 110-*c*. A UE 115 within a geographic coverage area 110 may communicate with the base station 105 providing network access for that geographic coverage area 110. For example, base station 105-*a* may provide support and network access for UE 115-*d* (e.g., via an access link 415 between base station 105-*a* and UE 115-*d*). Base stations 105-*a*, 105-*b*, and 105-*c* and UE 115-*d* may be examples of the corresponding devices described with reference to FIGS. 1 through 3.

Additionally, base stations 105-*a*, 105-*b*, and 105-*c* may be examples of IAB nodes within the IAB network as discussed with respect to FIGS. 2 and 3. As illustrated, base station 105-*b* may be an example of an IAB donor node or anchor node (a parent node) connected to a wireline backhaul 405. Base stations 105-*a* and 105-*c* may be examples of IAB relay nodes. These IAB relay nodes may communicate with other IAB nodes within the IAB network via wireless backhaul links 410. In this way, the wireless communications system 400 may relay communications between an IAB donor node and a UE 115 via one or more relay nodes. This may allow the system to support a large coverage area (e.g., composed of the geographic coverage areas 110 for all of the connected IAB nodes) using small cell nodes without installing a large number of physical wireline backhaul 405 links. For example, based on the wireless backhaul link 410, the wireline backhaul 405 may support both base station 105-*b* and base station 105-*a* and the corresponding geographic coverage areas 110-*b* and 110-*a*.

Each relay node in the IAB system may support both base station-type functionality and UE-type functionality. The base station-type functionality may involve transmitting signals to UEs 115 and receiving signals from UEs 115 through access links. For example, base station 105-*a* (e.g., an IAB relay node) may communicate with UE 115-*d* over an access link 415. The UE-type functionality may involve transmitting signals to another base station 105 (e.g., another relay node or an anchor node) and receiving signals from another base station 105 through backhaul links. For example, base station 105-*a* (e.g., an IAB relay node) may communicate with base station 105-*b* (e.g., an anchor node) over a wireless backhaul link 410.

Access links 415 and wireless backhaul links 410 may share wireless resources for transmissions. For example, transmissions over the access link 415 and the wireless backhaul link 410 may be time division multiplexed (TDMed), frequency division multiplexed (FDMed), space division multiplexed (SDMed), or some combination of these in the same set of wireless resources (e.g., the same frequency and time resources). Access links 415 and wireless backhaul links 410 may additionally share common architectures and/or procedures for supporting wireless communications. However, certain characteristics may be different for access links 415 and wireless backhaul links 410. For example, as compared to a UE 115, a relay node (e.g., a base station 105) may have a larger antenna array, a higher achievable transmit power, a lower experienced interference, lower mobility, etc., which may result in some different characteristics for a wireless backhaul link 410 between two base stations 105 and an access link 415 between a UE 115 and a base station 105. Accordingly, base stations 105 and UEs 115 may implement some link-specific signals, architectures, and/or procedures for communicating over different types of links (e.g., access links 415 as opposed to wireless backhaul links 410).

Additionally or alternatively, different base stations 105 may support different capabilities or processes. In a first example, base stations 105 corresponding to relay nodes in the IAB system may support a limited set of functions as compared to base stations 105 corresponding to anchor nodes. In a second example, different relay nodes in the IAB system may support different capabilities or functions. For example, a first relay node (e.g., base station 105-*a*) may support half-duplex communication, while a second relay node (e.g., base station 105-*c*) may support full-duplex communication. In half-duplex operation, a relay node may not be able to transmit and receive signals simultaneously or during a same TTI. In full-duplex operation, a relay node may transmit and receive signals simultaneously or during a same TTI or other time interval (e.g., based on the relay node including separated transmit/receive subarrays or panels, strong analog/digital-domain self-interference cancellation capabilities, etc.). In some cases, a relay node supporting full-duplex operation may be referred to as an "advanced" relay node.

To setup a wireless backhaul link 410, an IAB relay node (e.g., base station 105-*a*) may perform an initial relay integration procedure. This initial relay integration may be similar to an initial access procedure for a UE 115. For example, base station 105-*a* may detect base station 105-*b*, exchange a set of messages with base station 105-*b* as part of the integration procedure, and establish a wireless backhaul link 410 with base station 105-*b* based on a successful integration procedure. Upon setup of the wireless backhaul link 410, base station 105-*a* may function as a relay node for base station 105-*b*.

Base station 105-*a* may further perform IAB node discovery (e.g., inter-relay discovery) and synchronization. For example, after connecting to at least one wireless backhaul link 410, base station 105-*a* may attempt to discover and connect to additional wireless backhaul links 410 to attain redundant connectivity for improved robustness (e.g., using additional inter-relay connections). To discover additional IAB nodes for wireless backhaul connection, base station 105-*a* may transmit and/or monitor for DRSs 445. A DRS 445 may include, be an example of, or be a component of a synchronization signal block (SSB), a channel state information reference signal (CSI-RS), a tracking reference signal (TRS) (or TRS-type signal), or some combination of these or similar reference signals. In some cases, base station 105-*a* may transmit multiple DRSs 445 in a beam sweeping procedure. Additionally or alternatively, DRS 445 transmissions may support link maintenance at a base station 105. For example, once connected to one or more wireless backhaul links 410, base station 105-*a* may maintain the wireless backhaul links 410 (e.g., including time and/or frequency synchronization, beam management, etc.) using transmitted or received DRSs 445.

To efficiently perform discovery, an IAB relay node may transmit a capability report 425 in an upstream backhaul transmission 420. This upstream backhaul transmission 420 may be sent upstream in the IAB network (e.g., from a child node to a parent node using MT functionality at the child node) and may be transmitted as part of the initial relay integration procedure or following completion of the initial relay integration procedure. The capability report 425 may be similar to a UE capability report. For example, the capability report 425 may be an example of or may include an information element. The capability report 425 may include any number of parameters or capabilities associated with the relay node that relate to discovery capabilities.

For example, the capability report 425 may include an indication of the duplexing capability (e.g., half-duplex, full-duplex, or both) of the relay node. This indication may be, for example, a single bit or a bit field indicating support for either half-duplex or full-duplex operation (e.g., a 0 bit may indicate half-duplex operation, while a 1 bit may indicate full-duplex operation). In some cases, the relay node may support different duplexing capabilities in different environments, channels, or channel conditions. In some of these cases, the capability report 425 may indicate multiple duplexing capabilities of the relay node. For example, the relay node may support half-duplex operation in a first set of channels or channel types and may support full-duplex operation in a second set of channels or channel types. The capability report 425 may indicate in which channels or environments the relay node supports which duplexing capability. In some examples, the capability report 425 may indicate the duplexing capability of the relay node for discovery transmission and/or reception.

The capability report 425 or information element may include any number of other parameters (e.g., indicated by bits or bit fields) in addition to the duplexing capability. The duplexing capability of a relay node may be important for DRS 445 organization at relay nodes, as DRS 445 transmissions for half-duplex relay nodes should be TDMed such that the half-duplex relay nodes may both transmit DRSs 445 and monitor for DRSs 445 transmitted by other relay nodes (e.g., during different timing resources or occasions). In contrast, full-duplex relay nodes may transmit DRSs 445 and monitor for DRSs 445 transmitted by other relay nodes simultaneously (e.g., on the same set of time and/or frequency resources). As such, full-duplex relay nodes may be scheduled for DRS 445 transmissions on shared time and/or frequency resources to improve the resource efficiency of a discovery procedure, while half-duplex relay nodes may be scheduled for DRS 445 transmissions on different time and/or frequency resources to improve reception of the transmitted DRSs 445.

A parent node may receive the capability report 425 (e.g., using DU functionality at the parent node) from the child node. In some cases, the parent node may be an example of an anchor node (e.g., base station 105-*b* connected to a wireline backhaul 405). In other cases, the parent node may be an example of another relay node. If the parent node is a relay node, in some cases the relay node may transmit the capability report 425 upstream to an anchor node (e.g., via any number of additional relay nodes). Based on the capability report 425 for the relay node, the parent and/or anchor node may configure the relay node with resources for transmitting DRS 445 (e.g., DRS transmission resources) and with resources for monitoring for DRSs 445 from other IAB nodes (e.g., DRS measurement resources). For example, base station 105-*b* may configure resources for DRS handling at base station 105-*a* based on the capability report 425. Base station 105-*b* may then transmit a resource indication 435 in a downstream backhaul transmission 430 to base station 105-*a* over wireless backhaul link 410. This resource indication 435 may indicate the time and/or frequency resources for base station 105-*a* to use for transmitting DRSs 445 and for monitoring for DRSs 445. Base station 105-*a* may then transmit a DRS 445 in a discovery transmission 440 based on the assigned resources.

The DRS resources assigned to base station 105-*a* may be based on the capability report 425 for base station 105-*a*. For example, based on a reported duplexing capability, base station 105-*b* may assign base station 105-*a* to a specific "DRS group." Relay nodes in the same DRS group may share the same time and/or frequency DRS transmission resources for transmitting DRSs 445. Relay nodes in different DRS groups may use different (e.g., orthogonal) time and/or frequency DRS transmission resources for transmitting DRSs 445. With reference to FIG. 4, base station 105-*b* may act as a parent node for both base station 105-*a* and base station 105-*c*. Base station 105-*b* may receive a capability report 425 for each child base station 105 indicating the duplexing capabilities of the respective base station 105. In a first example, base stations 105-*a* and 105-*c* may both be full-duplex capable (e.g., for discovery procedures). Accordingly, base station 105-*b* may assign shared DRS resources for base stations 105-*a* and 105-*c* (e.g., by assigning both base station 105-*a* and base station 105-*c* to the same DRS group). In a second example, base stations 105-*a* and 105-*c* may both be half-duplex capable. Accordingly, base station 105-*b* may assign different DRS resources for base stations 105-*a* and 105-*c* (e.g., by assigning base station 105-*a* to a first DRS group and base station 105-*c* to a second DRS group different than the first DRS group). In this way, when base station 105-*a* transmits DRS 445, base station 105-*c* may be monitoring for DRSs 445. Similarly, when base station 105-*c* transmits DRS, base station 105-*a* may be monitoring for and receive the transmitted DRS. In a third example, base station 105-*a* may be half-duplex and base station 105-*c* may be full-duplex. In such cases, base station 105-*b* may assign base station 105-*a* and base station 105-*c* to different DRS groups or to the same DRS group.

In some cases, relay node grouping may be based on additional parameters. For example, base station 105-*b* (e.g., a parent node and/or anchor node) may determine DRS groups for a set of relay nodes based on duplexing capabilities, levels of self-interference cancellation (e.g., for full-duplex capable nodes), levels of interference between relay nodes, geographic locations of relay nodes, or some combination of these or other parameters relevant to DRS interference. Some of this information may be signaled to the parent node (e.g., base station 105-*b*) in the capability report 425, such as the level of self-interference cancellation for a relay node (e.g., base station 105-*a*). Base station 105-*b* may determine other information implicitly or based on other signaling. Base station 105-*b* may use a set of rules or some combination of these parameters to determine the DRS grouping. For example, the parent and/or anchor node may assign different relay nodes to the same DRS group if the relay nodes support full-duplexing and have a level of self-interference below a dynamic or pre-determined interference threshold. Additionally or alternatively, the parent and/or anchor node may assign different relay nodes to the same DRS group if the relay nodes are half-duplex capable but have low interference with each other. For example, if a set of relay nodes communicate using half-duplex operation but experience a level of interference below a dynamic or pre-determined interference threshold from transmissions by the other half-duplex relay nodes in the set, the parent and/or anchor node may group these relay nodes in a same DRS group. That is, half-duplex relay nodes may share the same resources for DRS 445 transmission if the half-duplex relay nodes interfere minimally with one another. Such half-duplex nodes may be geographically far apart (e.g., resulting in the low level of measured interference) and, correspondingly, may have a very weak wireless link or no wireless link between them. Accordingly, the half-duplex nodes may have a low chance of connecting via a wireless backhaul, and such a wireless backhaul link may provide minimal gain for the half-duplex nodes. As such, these half-duplex nodes may not need to monitor for DRSs 445 from one another, and the parent and/or anchor node can therefore assign these half-duplex nodes to a same DRS group. In some cases, the parent and/or anchor node may implicitly determine a level of interference between relay nodes based on the geographic locations of the relay nodes (e.g., far-apart nodes may be assumed to interfere minimally with one another). Base station 105-*b* may determine the DRS resources to allocate to the relay nodes based on the assigned DRS group (e.g., using an equation or table stored in memory and the DRS group identifier (ID)).

DRS grouping may not indicate sharing of other types of resources. For example, base stations 105 configured to share DRS transmission and/or measurement resources (e.g., full-duplex relay nodes) may not share control and/or data resources. In some cases, control channels, data channels, or both may need higher signal to interference ratios (SINR) than discovery transmissions 440 of DRSs 445. That is, a threshold interference level that supports simultaneous transmissions may be higher for DRS transmissions than data and/or control information transmissions. For example, if base station 105-*a* experiences a level of interference due to transmissions by base station 105-*c*, the level of interference may be within a dynamic or pre-determined threshold level of interference for sharing DRS resources, but may exceed a different dynamic or pre-determined threshold level of interference for sharing control/data resources. Therefore, control/data channels for different relay nodes may still use separate resources (e.g., the transmissions may be TDMed, FDMed, SDMed, etc.) even if the relay nodes are assigned the same DRS resources.

Base station 105-*b* may indicate the assigned DRS resources using the resource indication 435. In some cases, the parent and/or access node may transmit an indication of the time resources, the frequency resources, or both to the relay node, either directly or through a set of relay nodes. In these cases, the child node may not be aware of a DRS grouping for the child node. In other cases, the parent and/or access node may transmit an indication of the assigned DRS group ID to the relay node, and the relay node may determine the resources based on the DRS group ID (e.g., using an equation or table stored in memory and the received ID). The resource indication 435 may be transmitted as a component of a configuration message, such as RRC signaling or MAC signaling for DRS configuration. In some cases, the configuration message may include additional information, such as a transmit power for discovery transmissions 440, a channel state information (CSI) mapping pattern for DRSs 445, or some combination of these or other information.

In some cases, relay nodes may perform additional reporting to the parent and/or access node. For example, in addition to a one-time or semi-static transmission of the capability report 425, the relay node may report information related to one or more wireless backhaul links 410. This information may be related to backhaul link quality for a wireless backhaul link 410 between the relay node and a parent node or between the relay node and another relay node. In some cases, the backhaul link information may include a reference signal receive power (RSRP) for a wireless backhaul link 410 (e.g., based on received DRSs 445 or based on other signals received on the link), a SINR for the wireless backhaul link 410, a rank of the wireless backhaul link 410, or some combination of these or other information related to backhaul link quality and/or received DRSs 445. The relay node may transmit this additional information in reporting messages that are sent periodically, semi-statically, aperiodically (e.g., based on an event trigger), or some combination of these. Based on the report(s) received from one or more relay nodes, the parent and/or anchor node may refine a configuration for DRS resources and may transmit a refined resource indication 435 to the one or more relay nodes.

Figure 5:
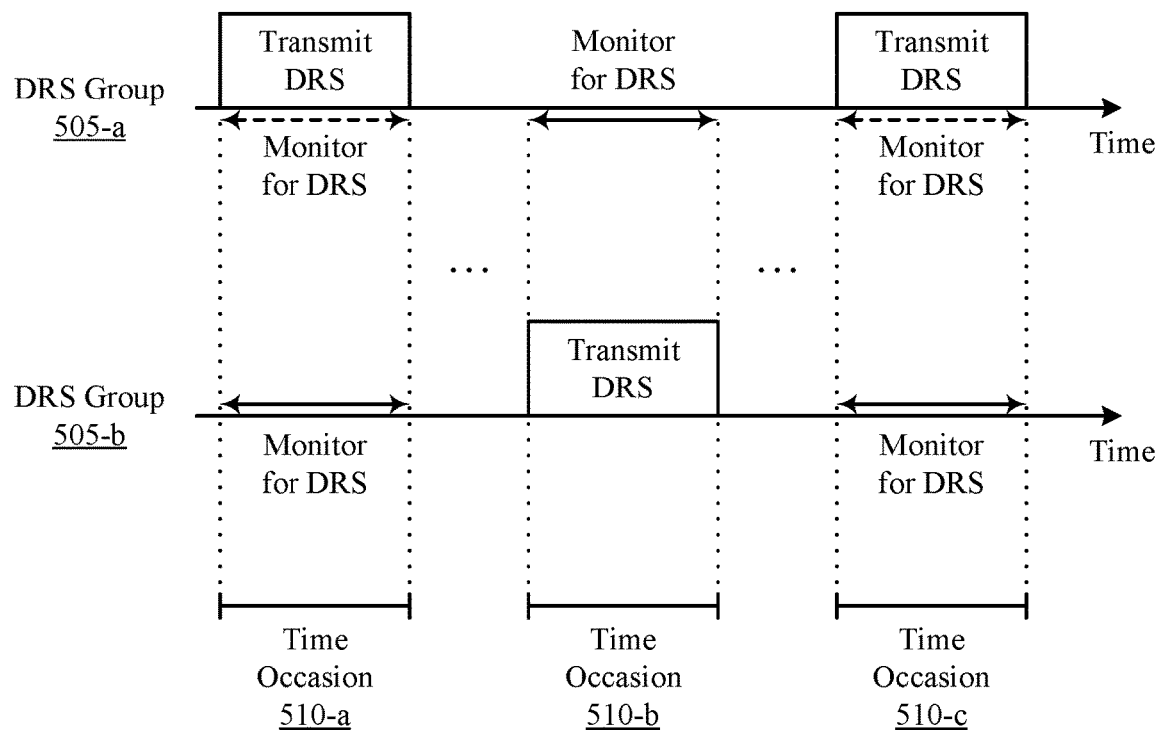
FIG. 5 illustrates an example of a DRS timeline that supports organization of inter-relay DRSs in accordance with aspects of the present disclosure.

FIG. 5 illustrates an example of a DRS timeline 500 that supports organization of inter-relay DRSs in accordance with aspects of the present disclosure. The DRS timeline 500 may correspond to resources assigned for DRS transmission (i.e., DRS transmission resources) and monitoring (i.e., DRS measurement resources) for different relay nodes in an IAB system, for example, as described above with reference to FIGS. 1 through 4. As illustrated, IAB nodes (e.g., base stations 105) such as relay nodes and/or donor nodes may be grouped into one of two DRS groups 505. As described below, each DRS group 505 may be composed of a number of relay nodes. However, in some cases, anchor nodes may also transmit DRSs, and may be included as part of a DRS group 505. A parent and/or anchor node may group relay nodes into any number of DRS groups 505. All relay nodes within a same DRS group 505 may transmit DRS simultaneously (e.g., using the same time resources within a time occasion 510). Relay nodes in different DRS groups 505 may transmit DRS at different times. The parent and/or anchor node may assign a relay node to a DRS group 505 based on characteristics of the relay node (e.g., duplexing capabilities, interference level from other IAB nodes, relative or absolute geographic location, etc.). While the DRS timeline 500 illustrates time resources for DRS monitoring and transmission corresponding to each DRS group 505, each DRS group 505 may additionally correspond to specific frequency resources for DRS monitoring and/or transmission.

For example, a parent node may assign a first relay node to DRS group 505-a based on the first relay node supporting full-duplexing capabilities. The parent node may assign any number of additional relay nodes to DRS group 505-a, for example, based on similar full-duplexing support. The parent node may additionally assign a second relay node to DRS group 505-b based on the second relay node supporting half-duplexing capabilities but not full-duplexing capabilities. DRS group 505-a and DRS group 505-b may correspond to different sets of DRS resources. For example, DRS group 505-a may correspond to DRS transmission resource allocations in time occasion 510-a and time occasion 510-c. In contrast, DRS group 505-b may correspond to DRS transmission resource allocations in time occasion 510-b. In some cases, the DRS groups 505 may additionally correspond to resources for DRS monitoring. For example, DRS group 505-a may correspond to DRS monitoring resource allocations in time occasion 510-a, 510-b, and 510-c, while DRS group 505-b may correspond to DRS monitoring resource allocations in time occasion 510-a and time occasion 510-c. As DRS group 505-a supports full-duplexing relay nodes, DRS group 505-a may include time occasions 510 with overlapping resources for DRS transmission and monitoring. For example, during time occasion 510-a, a full-duplex relay node assigned to DRS group 505-a may transmit DRSs while simultaneously (e.g., during a same TTI, sTTI, frame, subframe, slot, etc.) monitoring for DRS transmissions from other IAB nodes (e.g., relay nodes in the same DRS group 505-a or in other DRS groups 505). If a half-duplex relay node is assigned to DRS group 505-a, the half-duplex node may drop the monitoring occasions that overlap with transmission opportunities. For example, a half-duplex relay node in DRS group 505-a may transmit one or more DRSs during time occasion 510-a, monitor for DRSs during time occasion 510-b, and transmit one or more DRSs during time occasion 510-c. As DRS group 505-b supports half-duplexing relay nodes, DRS group 505-b may include non-overlapping time occasions 510 for DRS transmission and monitoring resources.

Based on this organization of inter-relay DRSs, IAB relay nodes in each of the DRS groups 505 may be granted opportunities to transmit DRSs while also monitoring during transmission opportunities for the other DRS group(s) 505. For example, when relay nodes in DRS group 505-a transmit DRSs in time occasion 510-a, relay nodes in both DRS group 505-a and DRS group 505-b may monitor the channel and detect the transmitted DRSs, allowing for discovery of other relay nodes in the IAB network. When relay nodes in DRS group 505-b transmit DRSs in time occasion 510-b, relay nodes in DRS group 505-a may monitor for and detect the transmitted DRSs. In some cases, if DRS group 505-b contains any full-duplex relay nodes, those relay nodes may additionally monitor for and detect DRSs transmitted in time occasion 510-b (e.g., monitoring within the same DRS group 505-b). The parent and/or access node may assign relay nodes to DRS groups 505 in such a way that relay nodes may support detection of all eligible relay nodes (e.g., relay nodes within a specific range that could possibly be detected and connected through wireless backhaul links). For example, half-duplex relay nodes that can discover one another may be assigned to different DRS groups 505 so that each half-duplex relay node may monitor for DRSs when the other half-duplex relay node is transmitting. In some cases, a parent and/or access node may re-assign relay nodes to different DRS groups 505 during different discovery periods (e.g., to support diverse discovery within the IAB network, or based on changing conditions or characteristics for the relay nodes).

Figure 6:
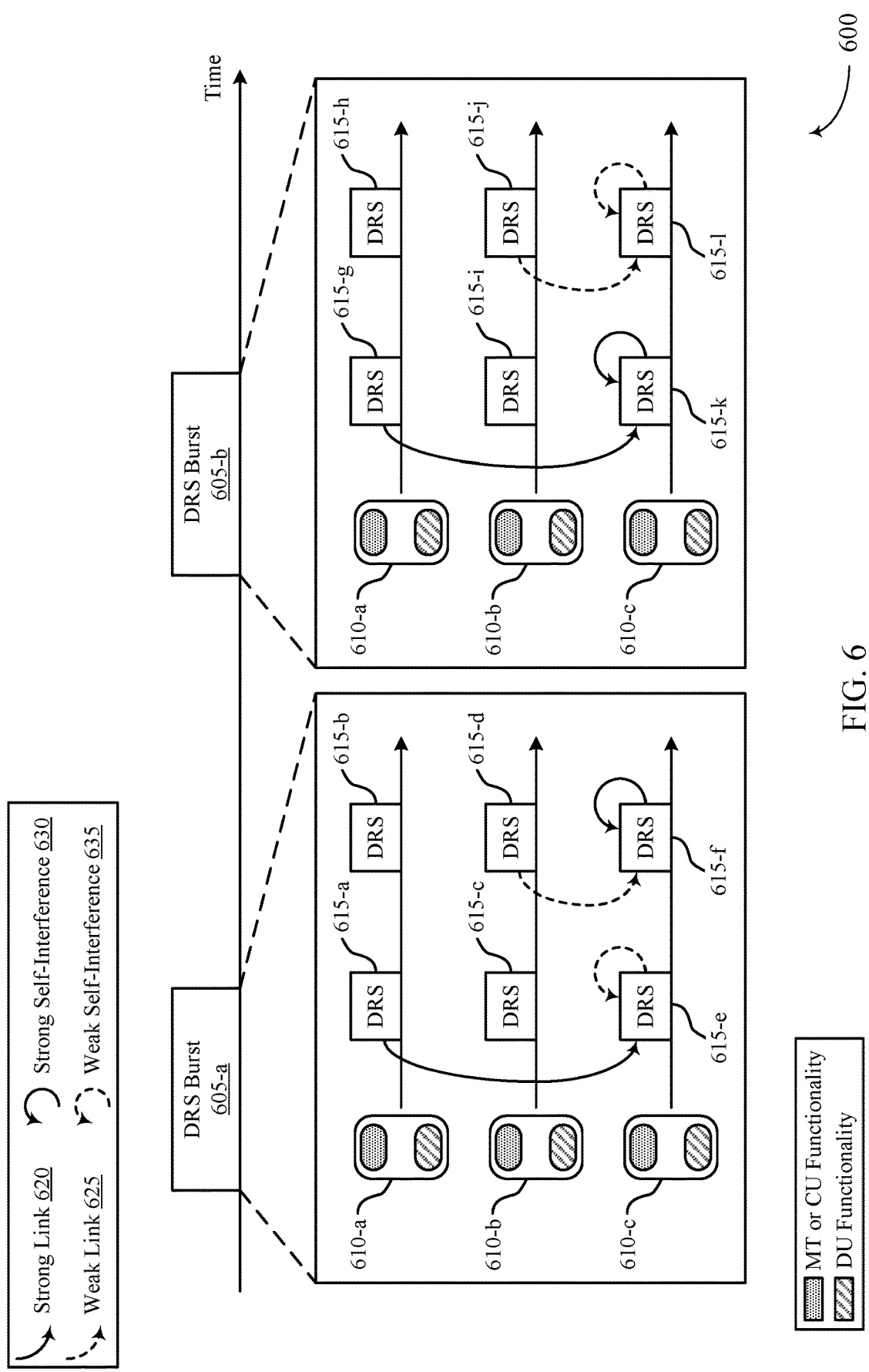
FIG. 6 illustrates an example of a beam rearrangement procedure that supports organization of inter-relay DRSs in accordance with aspects of the present disclosure.

FIG. 6 illustrates an example of a beam rearrangement procedure 600 that supports organization of inter-relay DRSs in accordance with aspects of the present disclosure. The beam rearrangement procedure 600 may be determined for DRS transmissions by a parent and/or access node or by a relay node 610 in an IAB system. These nodes may be examples of base stations 105 or the corresponding nodes as described above, for example, with reference to FIGS. 1 through 5. Although described below as relay nodes 610 (e.g., nodes supporting both MT and DU functionality), in some cases the DRS burst sets 605 may include DRS transmissions 615 and reception performed by anchor nodes (e.g., nodes supporting both CU and DU functionality). Beam arrangement for DRSs may correspond to a DRS burst set transmission using beam sweeping for a set of relay nodes 610 assigned to a same DRS group (e.g., as described above with respect to FIG. 5). During a discovery process, a relay node 610 of the group may transmit a set of DRSs using multiple beams, where each of the beams may correspond to a different beam direction, a different beam width, or a combination of the two. This DRS burst set 605 may involve a relay node 610 transmitting each DRS in short succession (e.g., performing consecutive DRS transmissions 615 over different beams) by sweeping through the determined set of transmit beams.

As illustrated, a set of three relay nodes 610—relay node 610-a, relay node 610-b, and relay node 610-c—may correspond to a same DRS group. Each of these relay nodes 610 may be examples of full-duplex nodes, where the relay nodes 610 may transmit DRS and receive DRS simultaneously. When a relay node 610 monitors for DRS transmissions simultaneous to transmitting one or more DRSs, the relay node 610 may experience residual self-interference due to transmitting the DRS(s). This self-interference may reduce the reliability of DRS reception at the relay node 610, as the self-interference may mask or interfere with any DRS transmitted over the channel by another relay node 610. In some cases, the strength of the residual self-interference experienced by a full-duplex relay node 610 may be different for different transmit beams. Additionally or alternatively, the residual self-interference affecting a DRS transmission 615 received from another relay node 610 may depend on the receive beam used by the full-duplex relay node 610 to receive the DRS transmission 615.

For example, as illustrated in FIG. 6, DRS burst set 605-a may involve relay nodes 610-a, 610-b, and 610-c each transmitting two DRS transmissions 615 in two time occasions (e.g., TTIs, transmission opportunities, etc.) using two different transmit beams in a beam sweeping procedure. The two time occasions may occur in contiguous TTIs, or may be separated by a buffer period or other transmission opportunities (e.g., for the same relay nodes 610 or for different devices in the IAB network). It is to be understood that the DRS group transmitting in DRS burst set 605-a may contain any number of relay nodes 610 (e.g., including full-duplex relay nodes, half-duplex relay nodes, or a combination of the two), and each DRS burst set 605 may include any number of DRS transmissions 615 using the same or different beams.

In the first time occasion, relay node 610-a may perform DRS transmission 615-a, relay node 610-b may perform DRS transmission 615-c, and relay node 610-c may perform DRS transmission 615-e. Each of these DRS transmissions 615 may be performed over a first transmit beam of a beam sweeping procedure for the respective relay node 610. This first transmit beam for relay node 610-a may generally be directed towards relay node 610-c, such that relay node 610-c may receive the DRS transmission 615-a over a strong link 620 (e.g., where the RSRP for DRS transmission 615-a at relay node 610-c is at or above some pre-determined link-strength threshold). Relay node 610-c may additionally experience a level of self-interference due to DRS transmission 615-e. However, based on the first transmit beam used by relay node 610-c, DRS transmission 615-e may result in weak self-interference 635 (e.g., with an interference level below some threshold interference level). Accordingly, based on receiving DRS transmission 615-a over a strong link 620 while experiencing weak self-interference 635, relay node 610-c may detect and receive DRS transmission 615-a. In this case, relay node 610-c may discover relay node 610-a during DRS burst set 605-a.

In the second time occasion of DRS burst set 605-a, relay node 610-a may perform DRS transmission 615-b, relay node 610-b may perform DRS transmission 615-d, and relay node 610-c may perform DRS transmission 615-f. Each of these DRS transmissions 615 may be performed over a second transmit beam of the beam sweeping procedure for the respective relay node 610. This second transmit beam for relay node 610-b may generally be directed towards relay node 610-c, such that relay node 610-c may receive the DRS transmission 615-d over a weak link 625 (e.g., where the receive strength is below the pre-determined link-strength threshold). In some cases, this link may be weak due to a distance between relay node 610-b and relay node 610-c, due to interference between relay node 610-b and relay node 610-c, due to the second transmit beam for relay node 610-b having a beam direction not pointed precisely enough towards relay node 610-c, or due to some combination of these or other reasons. Relay node 610-c may additionally experience strong self-interference 630 (e.g., at or above the threshold interference level) due to DRS transmission 615-f. Accordingly, based on the weak link 625 for DRS transmission 615-d and the strong self-interference 630 due to DRS transmission 615-f, relay node 610-c may not detect or receive DRS transmission 615-d. In this case, relay node 610-c may not discover relay node 610-b during DRS burst set 605-a, and the IAB network may not form a backhaul link between these relay nodes 610. In other cases, relay node 610-c may receive DRS transmission 615-d below some threshold RSRP and/or SINR value, and accordingly may determine that the RSRP and/or SINR value is not great enough to warrant a backhaul link.

To improve inter-relay discovery in the IAB network, the relay nodes 610 may rearrange the beam sweeping procedure in a subsequent DRS burst set 605-b. That is, the order of beams used for DRS transmissions 615 in a DRS burst set 605 is important for maximizing the benefit of full-duplexing and/or self-interference. In some cases, rearranging the order of transmit beams for DRS transmissions 615 within a DRS burst set 605 may be based on one or more link strength (e.g., RSRP) measurements, interference level measurements (e.g., for self-interference), or some combination of these measurements and/or additional parameters affecting discovery. For example, based on the strong link 620, weak link 625, weak self-interference 635, and/or strong self-interference 630 experienced by relay node 610-c during DRS burst set 605-a, the order of beams for the beam sweep performed by relay node 610-c in DRS burst set 605-b may be rearranged. In a first example, relay node 610-c may autonomously rearrange the beam sweep order based on some combination of these measurements. In a second example, the network (e.g., via a parent and/or anchor node for relay node 610-c) may configure relay node 610-c with the rearranged beam sweep order based on some combination of these measurements. In this example, relay node 610-c may report the RSRP and/or self-interference measurements upstream to the IAB network and may receive an updated beam sweeping configuration in response. In a third example, relay node 610-c may perform a random or pseudo-random shuffling of the beam order for the beam sweeping procedure (e.g., for each DRS burst set 605). In some cases, rearranging the beam sweeping procedure may involve using the same transmit beams for DRS transmissions 615 in a different order within the beam sweep. In other cases, rearranging the beam sweeping procedure may involve selecting one or more new beam directions and/or widths for DRS transmit beams and replacing one or more old beam directions and/or widths for the beam sweep.

Any of the above examples may result in an updated beam sweeping procedure for relay node 610-c in DRS burst set 605-b. Relay nodes 610-a and 610-b may or may not also rearrange beam sweeping orders in this subsequent DRS burst set 605. As illustrated, in a first time occasion of DRS burst set 605-b, relay node 610-a may perform DRS transmission 615-g using the same first transmit beam as in DRS burst set 605-a, relay node 610-b may perform DRS transmission 615-i using the same first transmit beam as in DRS burst set 605-a, and relay node 610-c may perform DRS transmission 615-k using the second transmit beam from DRS burst set 605-a as the first transmit beam in DRS burst set 605-b (e.g., due to the beam re-ordering). Accordingly, relay node 610-c may receive DRS transmission 615-g over a strong link 620 and may experience strong self-interference 630 due to DRS transmission 615-k. Due to the strong link 620 (e.g., despite the strong self-interference 630), relay node 610-c may discover a backhaul link with relay node 610-a. At the second time occasion of DRS burst set 605-b, relay node 610-a may perform DRS transmission 615-h using the same second transmit beam as in DRS burst set 605-a, relay node 610-b may perform DRS transmission 615-j using the same second transmit beam as in DRS burst set 605-a, and relay node 610-c may perform DRS transmission 615-l using the first transmit beam from DRS burst set 605-a as the second transmit beam in DRS burst set 605-b. Accordingly, relay node 610-c may receive DRS transmission 615-j over a weak link 625 and may experience weak self-interference 635 due to DRS transmission 615-l. Due to the weak self-interference 635 (e.g., despite the weak link 625), relay node 610-c may discover a backhaul link with relay node 610-b. In this way, re-ordering the transmit beams for relay node 610-c may result in full duplex relay node 610-c discovering and connecting with the other relay nodes 610-a and 610-b in the same DRS group.

Figure 7:
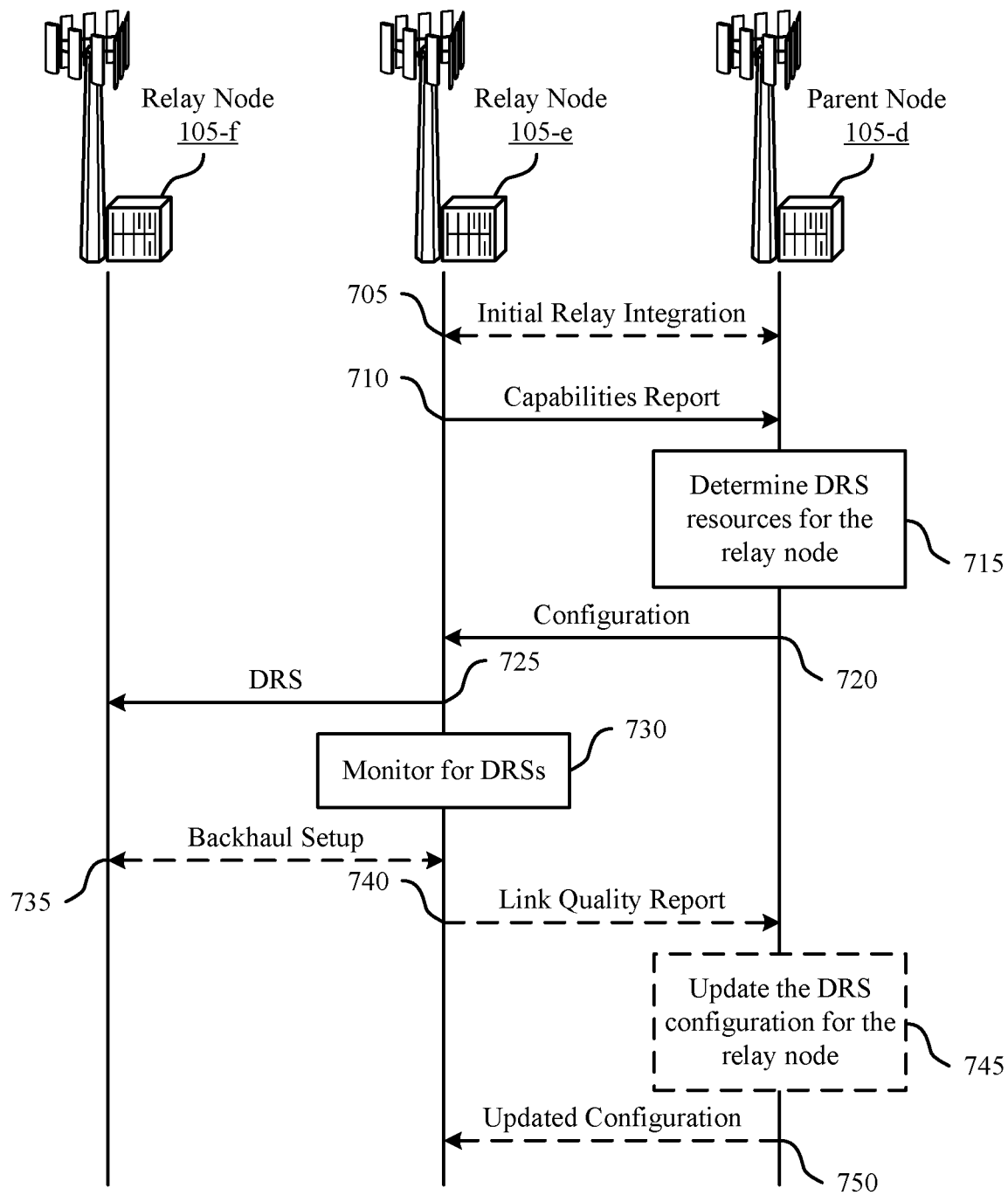
FIG. 7 illustrates an example of a process flow that supports organization of inter-relay DRSs in accordance with aspects of the present disclosure.

FIG. 7 illustrates an example of a process flow 700 that supports organization of inter-relay DRSs in accordance with aspects of the present disclosure. The process flow 700 may include a parent node (e.g., base station 105-d), which may or may not be an example of an anchor node, and two relay nodes (e.g., base stations 105-e and 105-f). These may be examples of the corresponding devices described with respect to FIGS. 1 through 6. Alternative examples of the following may be implemented, where some steps are performed in a different order than described or are not performed at all. In some cases, steps may include additional features not mentioned below, or further steps may be added.

At 705, the parent node and a first relay node (e.g., base station 105-*d* and base station 105-*e*) may perform an initial relay integration procedure. The initial relay integration procedure may establish a wireless backhaul link between the first relay node and the parent node, for example within an IAB network.

At 710, the first relay node (e.g., base station 105-*e*) may transmit, to the parent node, a report (e.g., a capabilities report) indicating a duplexing capability of the relay node. This report may be transmitted as part of the initial integration procedure or may be transmitted following establishment of the wireless backhaul link between the first relay node and the parent node. In some cases, the report may indicate that the relay node is full-duplexing capable, while in other cases the report may indicate that the relay node is half-duplexing capable. If the report indicates full-duplexing capability, the report may further include an indication of a level of self-interference cancellation supported by the relay node.

At 715, the parent node (e.g., base station 105-*d*) may determine DRS resources for the first relay node based on the indicated duplexing capability. These determined DRS resources may include DRS transmission resources for the first relay node to use for transmitting DRSs and DRS measurement resources for the first relay node to use for monitoring for DRSs from other nodes. For example, the parent node may determine DRS resources for a full-duplex relay node such that the resources for DRS transmission overlap in time (e.g., occur during a same TTI, time occasion, transmission opportunity, etc.) with the resources for monitoring for DRSs from other relay nodes. In contrast, for a half-duplex relay node, the parent node may determine DRS resources for DRS transmission that do not overlap in time with DRS resources for monitoring for DRSs from other relay nodes (e.g., DRS transmission and reception may occur in separate TTIs, time occasions, transmission opportunities, etc. for a half-duplex relay node).

In some cases, determining the DRS resources may involve assigning the first relay node to a DRS group that includes a set of relay nodes, where the determined DRS resources are common across the DRS group (e.g., the first relay node and the set of relay node may be configured with the same DRS transmission and/or monitoring resources). Different DRS groups may correspond to different DRS resource assignments. In some cases, the parent node may additionally determine an order of transmit beams for the first relay node to use to transmit a DRS burst set in the determined DRS resources using a transmit beam sweep (e.g., a beam sweeping procedure as described with reference to FIG. 6).

At 720, the parent node (e.g., base station 105-*d*) may transmit, to the first relay node (e.g., base station 105-*e*), a configuration that identifies the determined DRS resources (e.g., the determined DRS transmission and measurement resources). This configuration may be an example of a resource indication and may be transmitted via RRC signaling. The first relay node may receive the configuration and may identify the DRS resources in accordance with the indicated duplexing capability of the first relay node. In some cases, the configuration may include an explicit indication of time and/or frequency resources for the first relay node to use for DRS transmission, DRS monitoring, or both. In other cases, the configuration may include a DRS group ID (e.g., assigned by the parent node), and the first relay node may determine the DRS resources based on the received DRS group ID (e.g., using a lookup table or equation stored in memory). Additionally or alternatively, the configuration may include an indication of an order of transmit beams to use for a DRS transmit beam sweep in a DRS burst set.

At 725, the first relay node (e.g., base station 105-*e*) may transmit a DRS using the identified DRS transmission resources. In some cases, the DRS may be transmitted as part of a DRS burst set transmission (e.g., along with one or more additional DRSs using a set of transmit beams). The DRS may include at least a portion of an SSB, a CSI-RS, a TRS (or TRS-like signal), or some combination of these. In some cases, if another relay node (e.g., base station 105-*f*) is monitoring for DRSs when the DRS is transmitted, the other relay node may detect and receive the DRS at 725.

At 730, the first relay node (e.g., base station 105-*e*) may monitor for DRSs from other nodes in the system using the identified DRS measurement resources. If the first relay node is full-duplexing capable, the first relay node may perform the monitoring for and the transmitting of DRSs simultaneously (e.g., the DRS transmission resources overlap with the DRS measurement resources in at least a same TTI, time occasion, transmission opportunity, etc.). If the first relay node is half-duplexing capable, the first relay node may perform the monitoring for and the transmitting of DRSs during different time resources (e.g., the DRS transmission resources and the DRS measurement resources are non-overlapping in the time domain). In some cases, if another relay node (e.g., base station 105-*f*) transmits a DRS at 730, the first relay node may detect and receive the DRS based on the monitoring procedure.

If the first relay node discovers and/or is discovered by another relay node based on the DRS signaling, the first relay node (e.g., base station 105-*e*) and the other relay node (e.g., base station 105-*f*) may setup a wireless backhaul link at 735. This may improve robustness, redundancy, or both for backhaul transmissions in the IAB system.

In some cases, the first relay node may further transmit a report to the parent node at 740. The report may indicate a quality of a wireless backhaul link with a parent node (e.g., base station 105-*d*), another relay node (e.g., base station 105-*f*), or a combination of parent and relay nodes. In some cases, the first relay node may transmit the backhaul link quality report periodically, semi-statically, or aperiodically (e.g., in response to a trigger). The report may indicate an RSRP for a link, an SINR for a link, a rank for a link, a ranking of link qualities for multiple backhaul links, or some combination of this information.

At 745, the parent node (e.g., base station 105-*d*) may update the DRS configuration for the relay node based on the received report. For example, the parent node may determine refined DRS resources (e.g., DRS transmission resources, DRS measurement resources, or both) based on the backhaul link quality information. In some cases, the parent node may reorder transmit beams for a beam sweep procedure in a DRS burst set based on the received report. At 750, the parent node may transmit, to the first relay node, the updated configuration that identifies the refined DRS resources. Subsequently, the first relay node may transmit and/or monitor for DRSs based on the updated configuration (e.g., using the refined DRS resources, the re-ordered transmit beams, etc.). In some cases, the relay node may reorder transmit beams in a transmit beam sweep (e.g., without configuration from the parent node) either randomly or based on measurements from one or more previous DRS operations.

Figure 8:
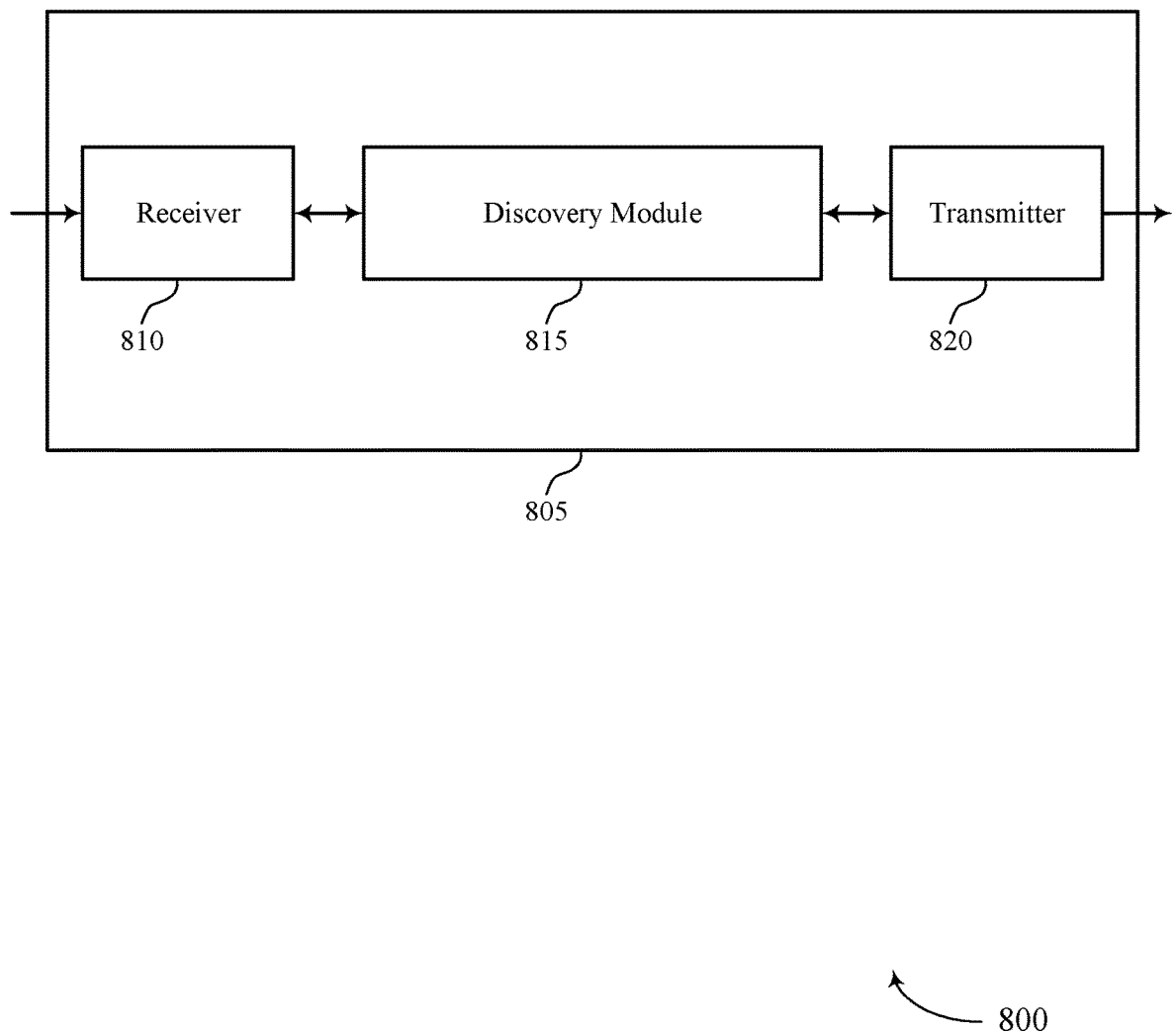
FIGS. 8 and 9 show block diagrams of devices that support organization of inter-relay DRSs in accordance with aspects of the present disclosure.

FIG. 8 shows a block diagram 800 of a device 805 that supports organization of inter-relay DRSs in accordance with aspects of the present disclosure. The device 805 may be an example of aspects of a base station 105 or a relay node as described herein. The device 805 may include a receiver 810, a discovery module 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to organization of inter-relay discovery reference signals, etc.). Information may be passed on to other components of the device 805. The receiver 810 may be an example of aspects of the transceiver 1120 described with reference to FIG. 11. The receiver 810 may utilize a single antenna or a set of antennas.

The discovery module 815 may transmit, to a parent node of the wireless communications system, a report indicating a duplexing capability of the relay node (i.e., the device 805), receive, from the parent node, a configuration that identifies DRS transmission resources and DRS measurement resources for the relay node in accordance with the indicated duplexing capability of the relay node, transmit a DRS using the identified DRS transmission resources, and monitor for DRSs from other nodes of the wireless communications system using the identified DRS measurement resources. The discovery module 815 may be an example of aspects of the discovery module 1110 described herein.

The processes performed by the discovery module 815 as described herein may support reduced discovery latency and improved reliability of discovery signal transmissions by a relay node (e.g., a base station 105, a low-power, portable relay device, etc.). For example, receiving a configuration for DRS transmission and measurement resources according to the duplexing capability of the relay node may improve the management of nodes with varying capabilities in an IAB system. In some cases, a half-duplex relay node may transmit and detect DRSs reliably, as the DRS transmission and measurement resources may not overlap in time for the half-duplex relay node. In some other cases, a full-duplex relay node may perform a low-latency discovery process, as the full-duplex relay node may efficiently transmit and receive DRSs in overlapping time resources.

Additionally or alternatively, based on receiving a configuration for DRS transmission and measurement resources according to the reported duplexing capability, a processor of the relay node (e.g., controlling the receiver 810, the discovery module 815, and/or the transmitter 820) may reduce the processing resources needed for IAB discovery. For example, the processor may turn on one or more processing units for transmitting DRSs and for monitoring for DRSs in resources assigned based on the capabilities of the processor (e.g., the duplexing capabilities of the relay node). This may reduce the discovery latency, supporting a lower processing overhead for IAB communications, as the relay node may not miss DRSs transmitted by nearby IAB nodes due to the duplexing capability-specific resource assignment.

The discovery module 815, or its sub-components, may be implemented in hardware, code (e.g., software or firmware) executed by a processor, or any combination thereof. If implemented in code executed by a processor, the functions of the discovery module 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The discovery module 815, or its sub-components, may be physically located at various positions, including being distributed such that portions of functions are implemented at different physical locations by one or more physical components. In some examples, the discovery module 815, or its sub-components, may be a separate and distinct component in accordance with various aspects of the present disclosure. In some examples, the discovery module 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
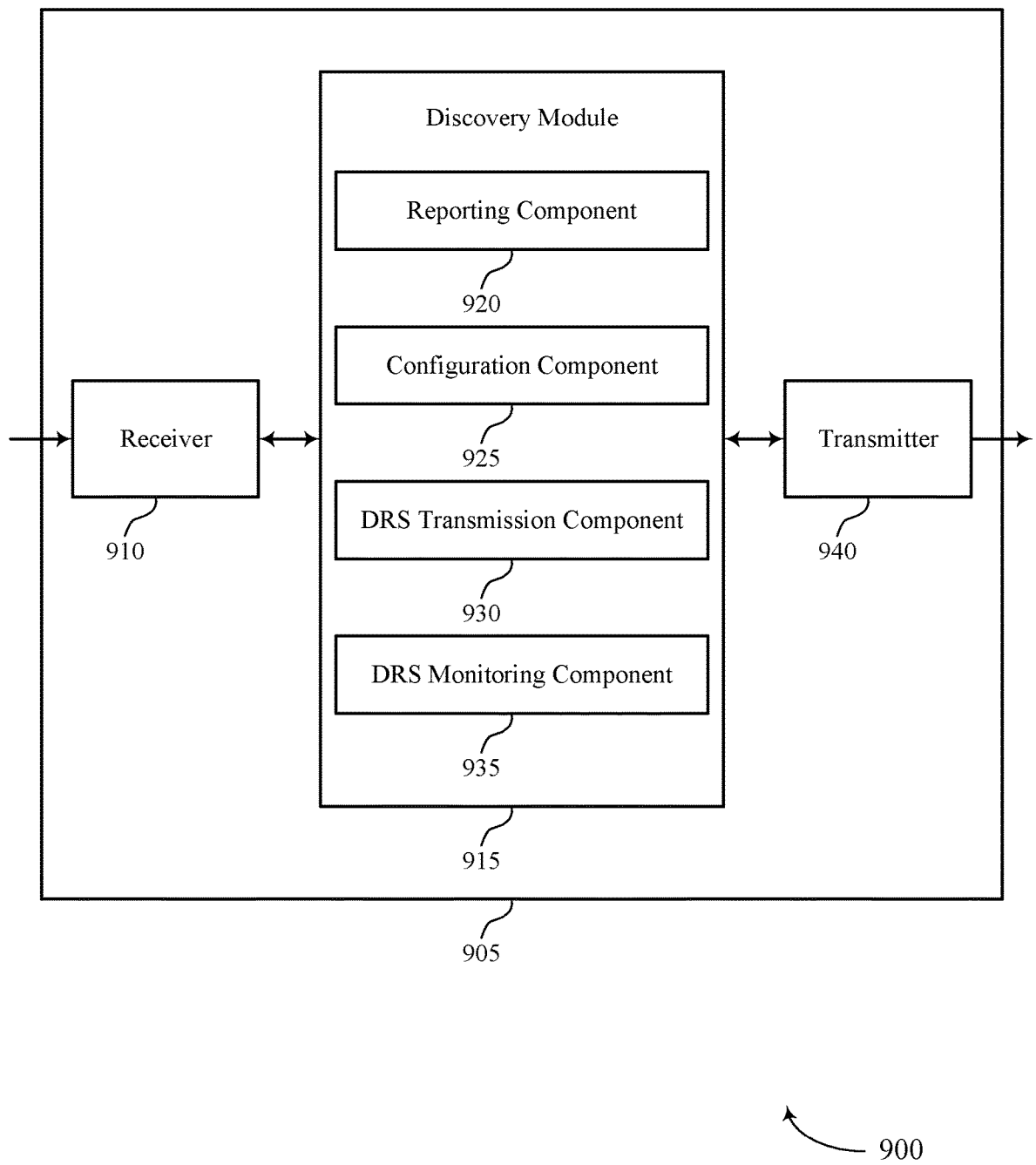

FIG. 9 shows a block diagram 900 of a device 905 that supports organization of inter-relay DRSs in accordance with aspects of the present disclosure. The device 905 may be an example of aspects of a device 805, a base station 105, or a relay node as described herein. The device 905 may include a receiver 910, a discovery module 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to organization of inter-relay discovery reference signals, etc.). Information may be passed on to other components of the device 905. The receiver 910 may be an example of aspects of the transceiver 1120 described with reference to FIG. 11. The receiver 910 may utilize a single antenna or a set of antennas.

The discovery module 915 may be an example of aspects of the discovery module 815 as described herein. The discovery module 915 may include a reporting component 920, a configuration component 925, a DRS transmission component 930, and a DRS monitoring component 935. The discovery module 915 may be an example of aspects of the discovery module 1110 described herein.

The reporting component 920 may transmit, to a parent node of the wireless communications system, a report indicating a duplexing capability of the relay node (i.e., the device 905).

The configuration component 925 may receive, from the parent node, a configuration that identifies DRS transmission resources and DRS measurement resources for the relay node in accordance with the indicated duplexing capability of the relay node. The DRS transmission component 930 may transmit a DRS using the identified DRS transmission resources. The DRS monitoring component 935 may monitor for DRSs from other nodes of the wireless communications system using the identified DRS measurement resources.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
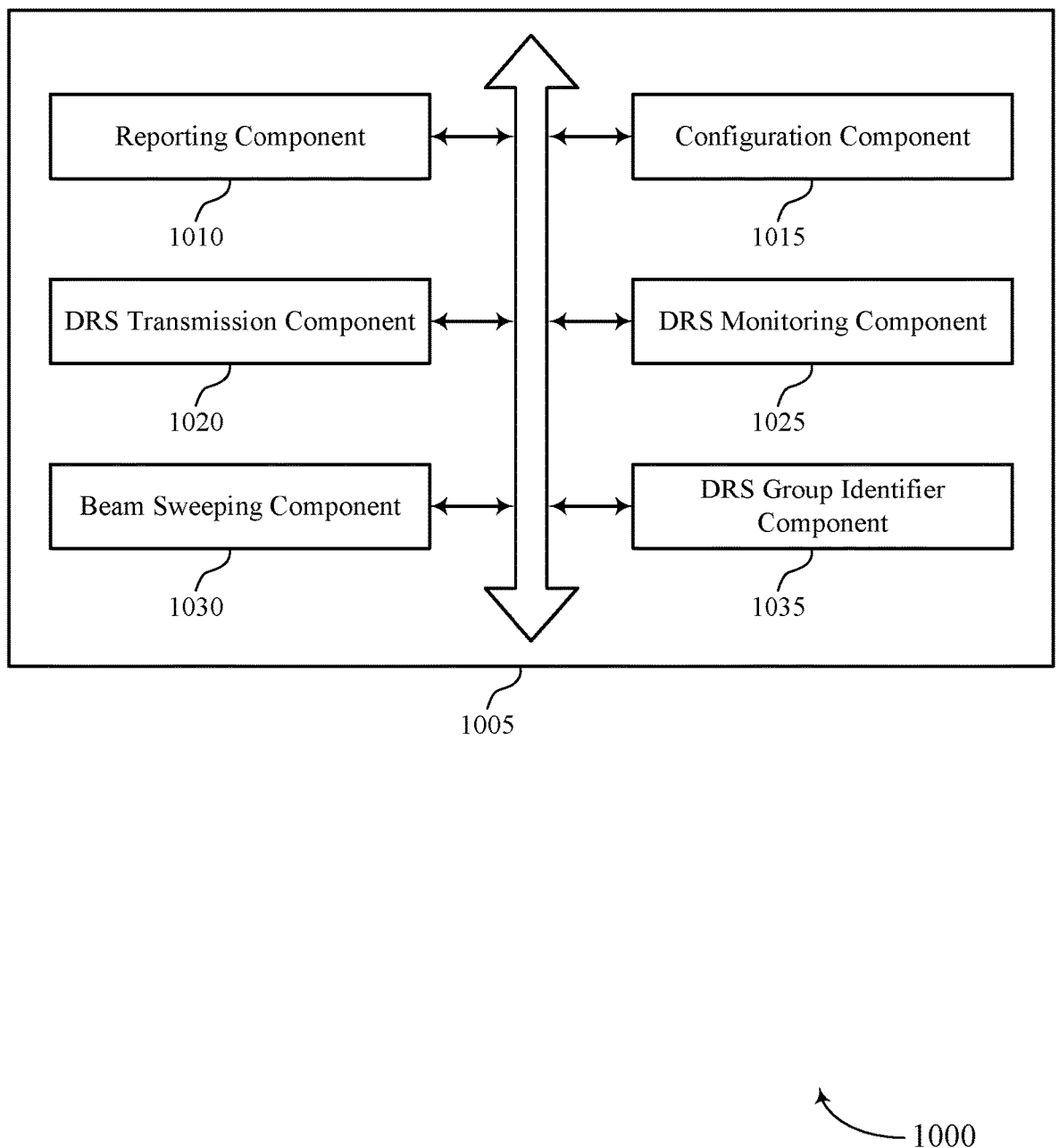
FIG. 10 shows a block diagram of a discovery module that supports organization of inter-relay DRSs in accordance with aspects of the present disclosure.

FIG. 10 shows a block diagram 1000 of a discovery module 1005 that supports organization of inter-relay DRSs in accordance with aspects of the present disclosure. The discovery module 1005 may be an example of aspects of a discovery module 815, a discovery module 915, or a discovery module 1110 described herein. The discovery module 1005 may include a reporting component 1010, a configuration component 1015, a DRS transmission component 1020, a DRS monitoring component 1025, a beam sweeping component 1030, and a DRS group identifier component 1035. Each of these modules may communicate, directly or indirectly, with one another (e.g., via one or more buses).

The reporting component 1010 may transmit, to a parent node of the wireless communications system, a report indicating a duplexing capability of the relay node (i.e., a device containing the discovery module 1005). In some examples, the reporting component 1010 may transmit the report indicating a set of duplexing capabilities of the relay node, where the set of duplexing capabilities includes at least the duplexing capability. The configuration component 1015 may receive, from the parent node, a configuration that identifies DRS transmission resources and DRS measurement resources for the relay node in accordance with the indicated duplexing capability of the relay node. In some examples, the configuration component 1015 may receive the configuration via radio resource control signaling or MAC signaling, such as a MAC CE.

In some cases, the transmitted report indicates that the duplexing capability of the relay node includes a full duplexing capability. In these cases, the DRS transmission resources for the relay node to use to transmit the DRS include a same transmission time interval as the DRS measurement resources for the relay node to use to monitor for the DRSs from other relay nodes of the wireless communications system.

In some cases, the transmitted report indicates that the duplexing capability of the relay node includes a half duplexing capability. In these cases, the DRS transmission resources for the relay node to use to transmit the DRS include a first transmission time interval and the DRS measurement resources for the relay node to use to monitor for the DRSs from other nodes include a second (e.g., different, non-overlapping) transmission time interval.

In some cases, the report indicating the duplexing capability of the relay node is transmitted during an initial integration procedure for the relay node that establishes a wireless backhaul link with the parent node. In other cases, the report indicating the duplexing capability of the relay node is transmitted after a wireless backhaul link with the parent node is established. In some cases, the report indicating the duplexing capability of the relay node further includes a level of self-interference cancellation for the relay node.

In some examples, the reporting component 1010 may transmit, to the parent node, a report indicating a quality of a wireless backhaul link with the parent node or with a second relay node of the wireless communications system. In some examples, the configuration component 1015 may receive, in response to the transmitted report indicating the quality of the wireless backhaul link, a second configuration that identifies refined DRS transmission resources, or refined DRS measurement resources, or a combination thereof for the relay node.

In some cases, the report indicating the quality of the wireless backhaul link is transmitted periodically, or semi-statically, or aperiodically, or in response to a trigger. In some cases, the report indicating the quality of the wireless backhaul link indicates an RSRP, or an SINR, or a rank of the wireless backhaul link, or a self-interference strength, or a combination thereof.

The DRS transmission component 1020 may transmit a DRS using the identified DRS transmission resources. In some cases, the DRS includes at least a portion of an SSB, or a CSI-RS, or a TRS (or TRS-like signal). The DRS monitoring component 1025 may monitor for DRSs from other nodes of the wireless communications system using the identified DRS measurement resources.

In some cases, transmitting the DRS using the identified DRS transmission resources may involve the beam sweeping component 1030 transmitting the DRS in a DRS burst set using a transmit beam sweep. In some examples, the beam sweeping component 1030 may measure an RSRP, or an SINR, or a self-interference strength, or a combination thereof. The beam sweeping component 1030 may reorder, based on the measurement, an order of transmit beams used for the transmit beam sweep. In some examples, the beam sweeping component 1030 may receive, from the parent node, an indication of an order of transmit beams used for the transmit beam sweep.

In some cases, receiving the configuration may involve the DRS group identifier component 1035 receiving a DRS group identifier. In some examples, the DRS group identifier component 1035 may identify the DRS transmission resources and the DRS measurement resources based on the received DRS group identifier.

Figure 11:
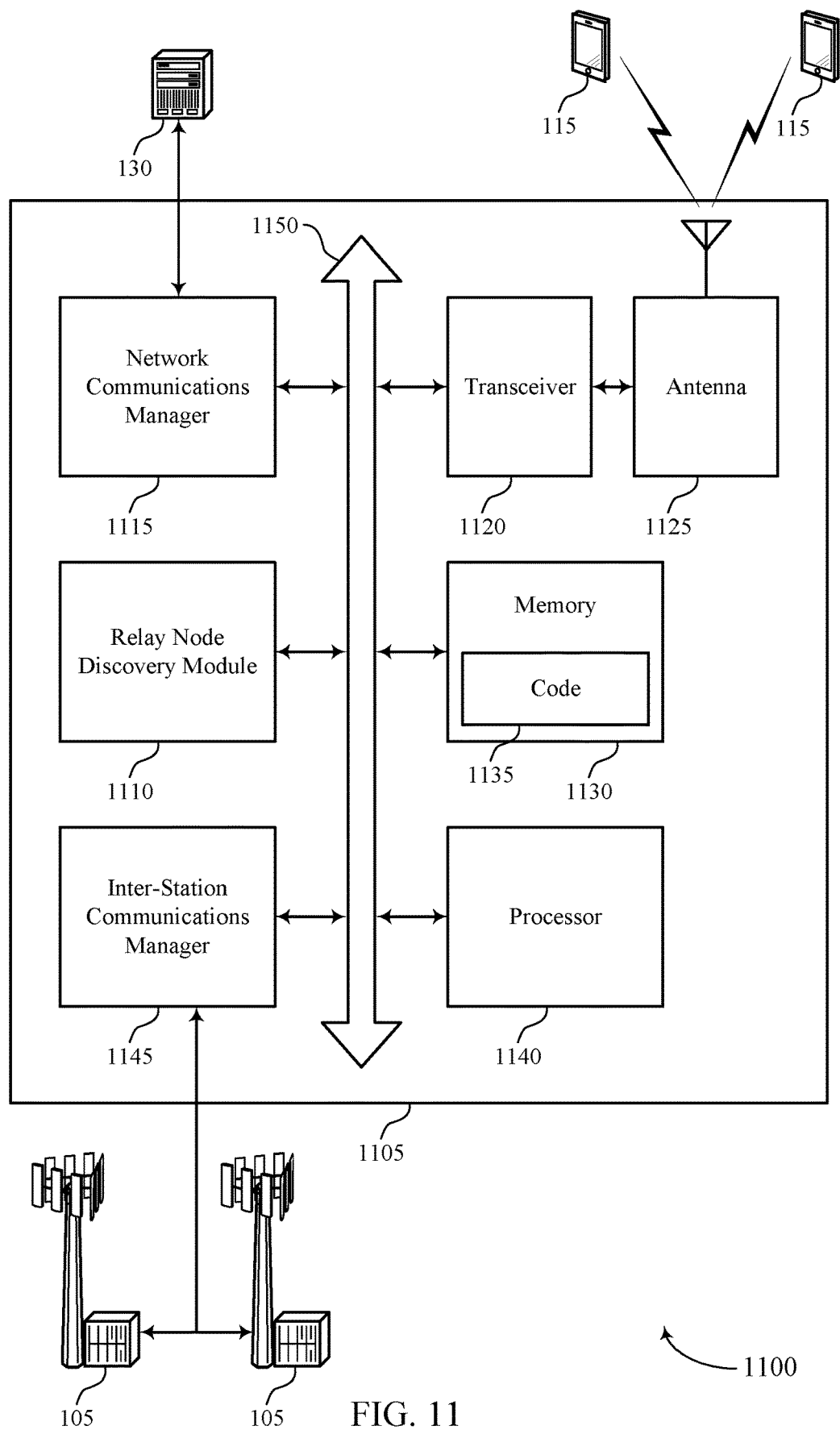
FIG. 11 shows a diagram of a system including a device that supports organization of inter-relay DRSs in accordance with aspects of the present disclosure.

FIG. 11 shows a diagram of a system 1100 including a device 1105 that supports organization of inter-relay DRSs in accordance with aspects of the present disclosure. The device 1105 may be an example of or include the components of device 1105, device 1105, a base station 105, or a relay node as described herein. The device 1105 may include components for bi-directional voice and data communications including components for transmitting and receiving communications, including a discovery module 1110, a network communications manager 1115, a transceiver 1120, an antenna 1125, memory 1130, a processor 1140, and an inter-station communications manager 1145. These components may be in electronic communication via one or more buses (e.g., bus 1150).

The discovery module 1110 may transmit, to a parent node of the wireless communications system, a report indicating a duplexing capability of the relay node (i.e., the device 1105), receive, from the parent node, a configuration that identifies DRS transmission resources and DRS measurement resources for the relay node in accordance with the indicated duplexing capability of the relay node, transmit a DRS using the identified DRS transmission resources, and monitor for DRSs from other nodes of the wireless communications system using the identified DRS measurement resources.

The network communications manager 1115 may manage communications with the core network 130 (e.g., via one or more wireless backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random access memory (RAM), read-only memory (ROM), or a combination thereof. The memory 1130 may store computer-readable code 1135 including instructions that, when executed by a processor (e.g., the processor 1140) cause the device to perform various functions described herein. In some cases, the memory 1530 may contain, among other things, a basic input/output system (BIOS) which may control basic hardware or software operation such as the interaction with peripheral components or devices.

The processor 1140 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting organization of inter-relay discovery reference signals).

The inter-station communications manager 1145 may manage communications with other base station 105 and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
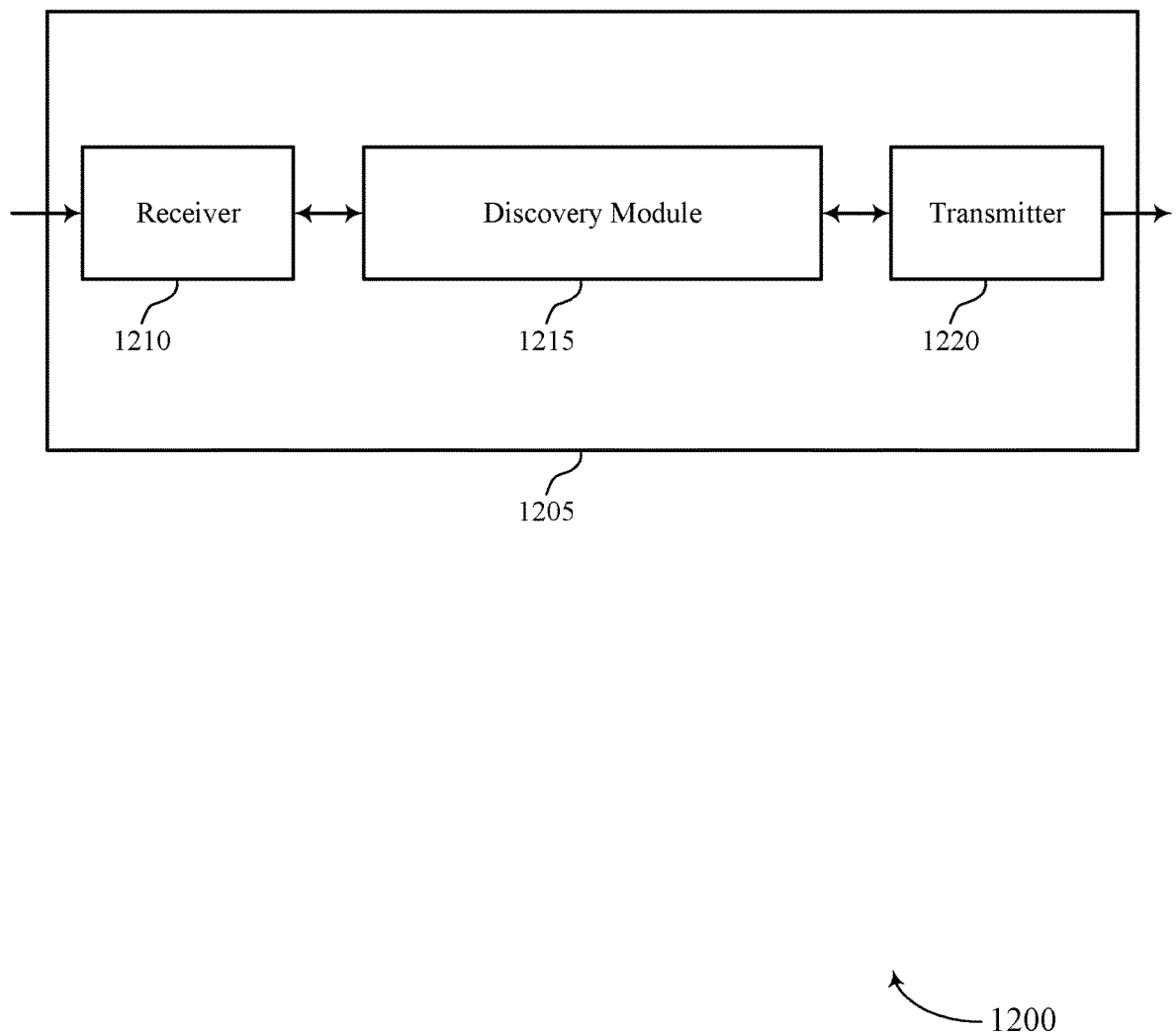
FIGS. 12 and 13 show block diagrams of devices that support organization of inter-relay DRSs in accordance with aspects of the present disclosure.

FIG. 12 shows a block diagram 1200 of a device 1205 that supports organization of inter-relay DRSs in accordance with aspects of the present disclosure. The device 1205 may be an example of aspects of a base station 105 or a parent node (e.g., an anchor or relay node) as described herein. The device 1205 may include a receiver 1210, a discovery module 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to organization of inter-relay discovery reference signals, etc.). Information may be passed on to other components of the device 1205. The receiver 1210 may be an example of aspects of the transceiver 1520 described with reference to FIG. 15. The receiver 1210 may utilize a single antenna or a set of antennas.

The discovery module 1215 may receive, from a relay node of the wireless communications system, a report indicating a duplexing capability of the relay node, determine DRS transmission resources and DRS measurement resources for the relay node based on the indicated duplexing capability of the relay node, and transmit, to the relay node, a configuration that identifies the determined DRS transmission resources and the determined DRS measurement resources. The discovery module 1215 may be an example of aspects of the discovery module 1510 described herein.

The processes performed by the discovery module 1215 as described herein may support reduced discovery latency and improved reliability of discovery signal transmissions in an IAB system. For example, transmitting a configuration for DRS transmission and measurement resources according to the duplexing capability of the relay node may improve the management of nodes with varying capabilities in the IAB system (e.g., by a parent node). In some cases, the resource allocation based on the duplexing capabilities of relay nodes may support half-duplex relay nodes transmitting and detecting DRSs reliably, as the DRS transmission and measurement resources may not overlap in time for the half-duplex relay nodes, and full-duplex relay nodes performing low-latency discovery processes, as the full-duplex relay nodes may efficiently transmit and receive DRSs in overlapping time resources. This may reduce the number of discovery processes needed by the IAB system, lowering the overhead at the parent node associated with configuring relay nodes for discovery.

Additionally or alternatively, based on determining DRS transmission and measurement resources for relay nodes according to the indicated duplexing capabilities of the relay nodes, a processor of the parent node (e.g., controlling the receiver 1210, the discovery module 1215, and/or the transmitter 1220) may reduce the processing resources needed for resource assignment. For example, the processor may turn on one or more processing units for determining the resource configurations and transmitting the resource configurations. By basing these configurations on the duplexing capabilities of the relay nodes, the discovery processes at the relay nodes may be more reliable and, as such, the relay nodes may reduce the number of requests for discovery signaling opportunities. This reduced number of requests may support the processor of the parent node remaining in a low power mode for a greater amount of time, improving the efficiency of the processor of the parent node.

The discovery module 1215, or its sub-components, may be implemented in hardware, code (e.g., software or firmware) executed by a processor, or any combination thereof. If implemented in code executed by a processor, the functions of the discovery module 1215, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The discovery module 1215, or its sub-components, may be physically located at various positions, including being distributed such that portions of functions are implemented at different physical locations by one or more physical components. In some examples, the discovery module 1215, or its sub-components, may be a separate and distinct component in accordance with various aspects of the present disclosure. In some examples, the discovery module 1215, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
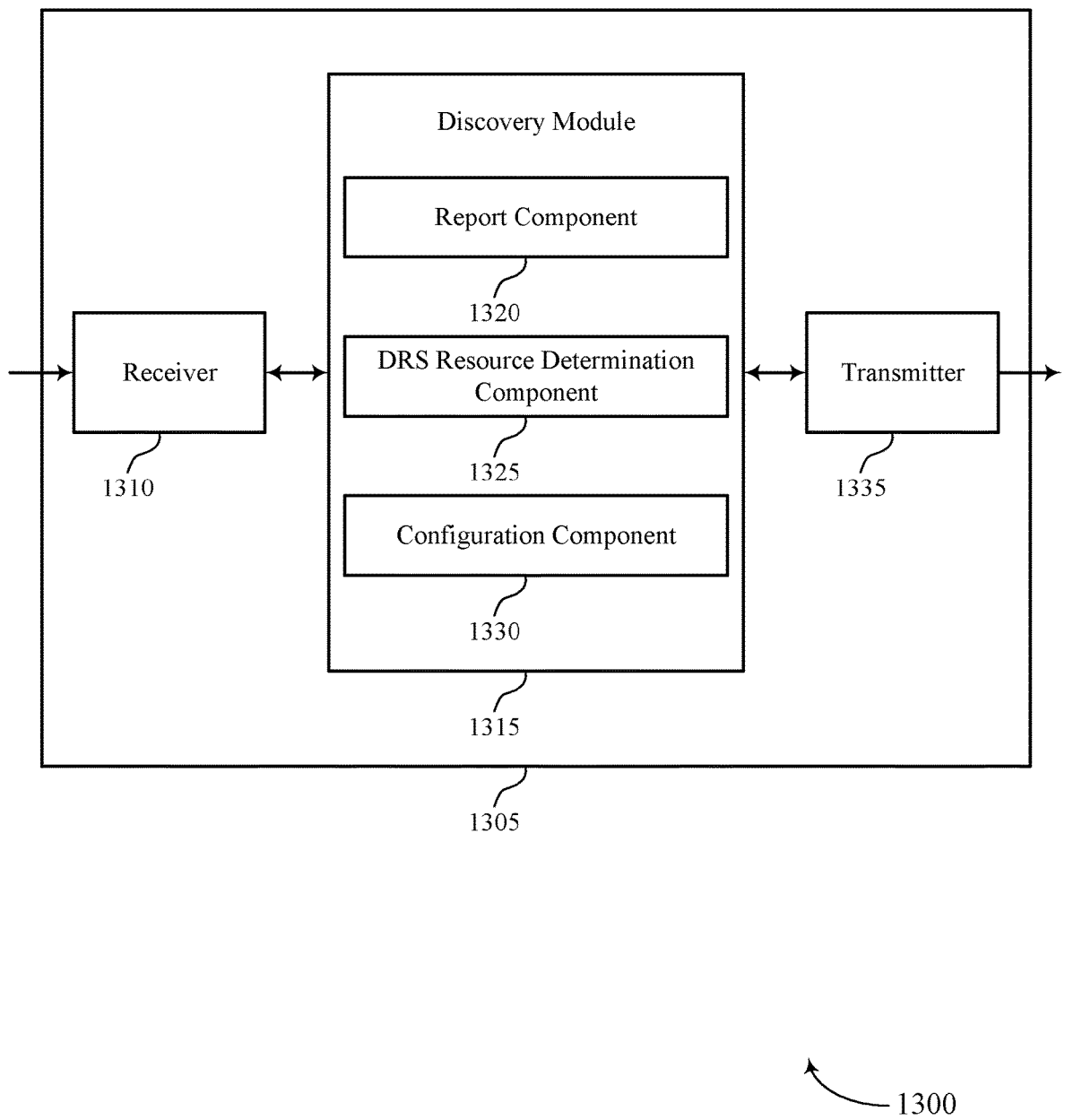

FIG. 13 shows a block diagram 1300 of a device 1305 that supports organization of inter-relay DRSs in accordance with aspects of the present disclosure. The device 1305 may be an example of aspects of a device 1205, a base station 105, or a parent node (e.g., an anchor or relay node) as described herein. The device 1305 may include a receiver 1310, a discovery module 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to organization of inter-relay discovery reference signals, etc.). Information may be passed on to other components of the device 1305. The receiver 1310 may be an example of aspects of the transceiver 1520 described with reference to FIG. 15. The receiver 1310 may utilize a single antenna or a set of antennas.

The discovery module 1315 may be an example of aspects of the discovery module 1215 as described herein. The discovery module 1315 may include a report component 1320, a DRS resource determination component 1325, and a configuration component 1330. The discovery module 1315 may be an example of aspects of the discovery module 1510 described herein.

The report component 1320 may receive, from a relay node of the wireless communications system, a report indicating a duplexing capability of the relay node. The DRS resource determination component 1325 may determine DRS transmission resources and DRS measurement resources for the relay node based on the indicated duplexing capability of the relay node. The configuration component 1330 may transmit, to the relay node, a configuration that identifies the determined DRS transmission resources and the determined DRS measurement resources.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
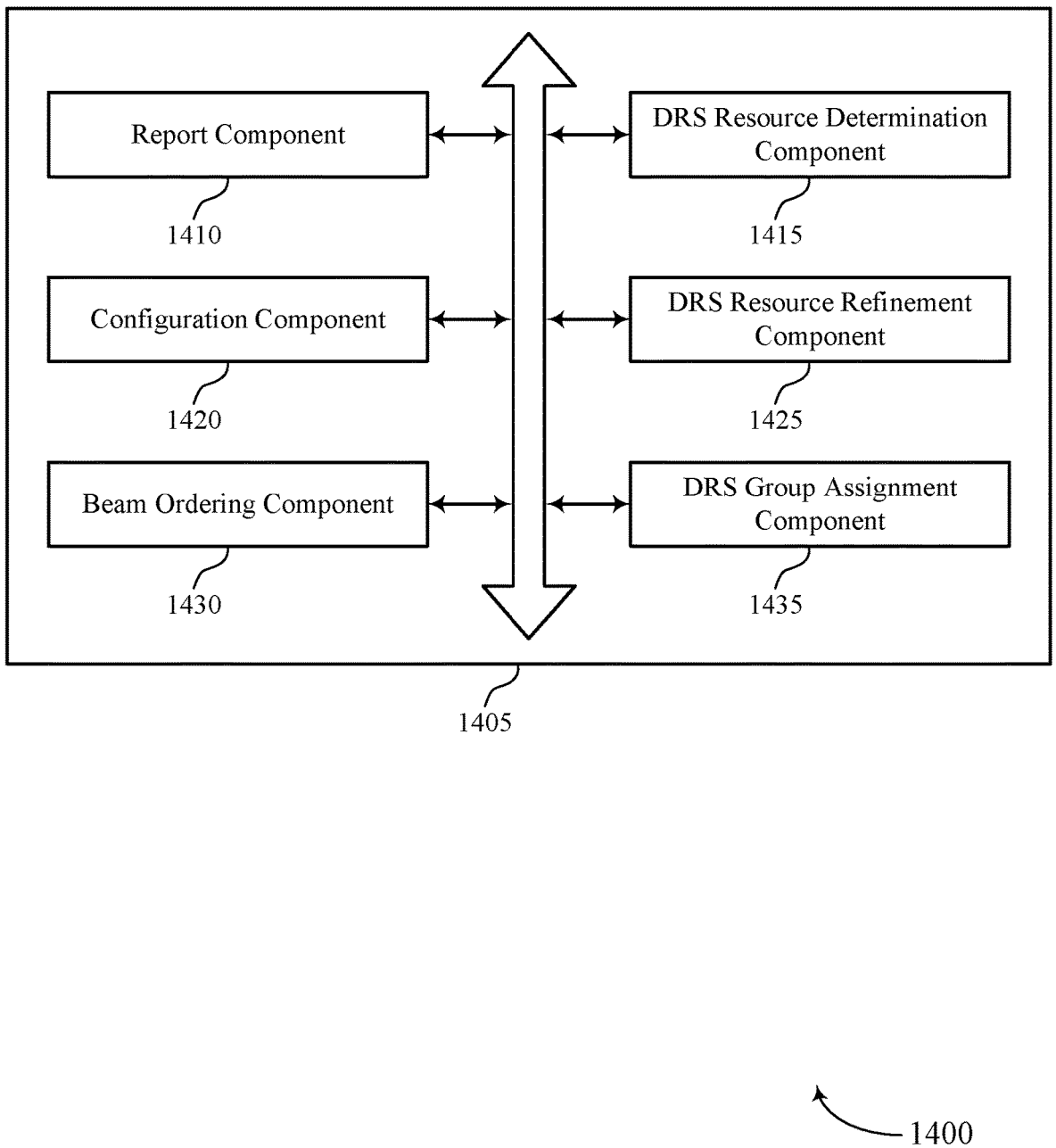
FIG. 14 shows a block diagram of a discovery module that supports organization of inter-relay DRSs in accordance with aspects of the present disclosure.

FIG. 14 shows a block diagram 1400 of a discovery module 1405 that supports organization of inter-relay DRSs in accordance with aspects of the present disclosure. The discovery module 1405 may be an example of aspects of a discovery module 1215, a discovery module 1315, or a discovery module 1510 described herein. The discovery module 1405 may include a report component 1410, a DRS resource determination component 1415, a configuration component 1420, a DRS resource refinement component 1425, a beam ordering component 1430, and a DRS group assignment component 1435. Each of these modules may communicate, directly or indirectly, with one another (e.g., via one or more buses).

The report component 1410 may receive, from a relay node of the wireless communications system, a report indicating a duplexing capability of the relay node. In some cases, the report indicating the duplexing capability of the relay node is received during an initial integration procedure for the relay node that establishes a wireless backhaul link with the parent node. In other cases, the report indicating the duplexing capability of the relay node is received after a wireless backhaul link with the parent node is established. In some cases, the report indicating the duplexing capability of the relay node further includes a level of self-interference cancellation for the relay node.

The DRS resource determination component 1415 may determine DRS transmission resources and DRS measurement resources for the relay node based on the indicated duplexing capability of the relay node. In some examples, the report component 1410 may identify that the received report indicates that the duplexing capability of the relay node is a full duplexing capability. In these examples, the DRS resource determination component 1415 may determine the DRS transmission resources for the relay node to use to transmit a DRS include a same transmission time interval as the DRS measurement resources for the relay node to use to monitor for DRSs from other relay nodes. In other examples, the report component 1410 may identify that the received report indicates that the duplexing capability of the relay node is a half duplexing capability. In these examples, the DRS resource determination component 1415 may determine the DRS transmission resources for the relay node to use to transmit the DRS include a first transmission time interval and the DRS measurement resources for the relay node to use to monitor for the DRSs from other nodes include a second transmission time interval.

The configuration component 1420 may transmit, to the relay node, a configuration that identifies the determined DRS transmission resources and the determined DRS measurement resources. In some examples, the configuration component 1420 may transmit the configuration via radio resource control signaling or MAC signaling, such as a MAC CE.

The DRS resource refinement component 1425 may receive, from the relay node, a report indicating a quality of a wireless backhaul link with the parent node or with a second relay node of the wireless communications system. In some examples, the DRS resource refinement component 1425 may determine refined DRS transmission resources, or refined DRS measurement resources, or a combination thereof for the relay node based on the received report indicating the quality of the wireless backhaul link. In some examples, the DRS resource refinement component 1425 may transmit, to the relay node, a second configuration that identifies the refined DRS transmission resources, or the refined DRS measurement resources, or the combination thereof for the relay node.

In some cases, the report indicating the quality of the wireless backhaul link is transmitted periodically, or semi-statically, or aperiodically, or in response to a trigger. In some cases, the report indicating the quality of the wireless backhaul link indicates an RSRP, or an SINR, or a rank of the wireless backhaul link, or a self-interference strength, or a combination thereof.

The beam ordering component 1430 may transmit, to the relay node, an indication of an order of transmit beams for the relay node to use to transmit a DRS burst set using a transmit beam sweep.

The DRS group assignment component 1435 may assign the relay node to a DRS group that includes a first set of relay nodes, where the determined DRS transmission resources and the determined DRS measurement resources are common to the first set of relay nodes. In some examples, the DRS group assignment component 1435 may transmit a DRS group identifier for the DRS group that identifies the determined DRS transmission resources and the determined DRS measurement resources.

In some examples, the DRS group assignment component 1435 may assign a second relay node to a second DRS group that includes a second set of relay nodes. In some examples, the DRS group assignment component 1435 may determine second DRS transmission resources and second DRS measurement resources for the second set of relay nodes different from the determined DRS transmission resources, or the determined DRS measurement resources, or a combination thereof for the first set of relay nodes. In some cases, the relay node is assigned to the DRS group based on the duplexing capability of the relay node, or a location of the relay node, or a level of interference between the relay node and a second relay node, or a self-interference strength of the relay node, or a combination thereof. In some cases, at least two of the relay nodes of the DRS group have different control resources, or data resources, or a combination thereof.

Figure 15:
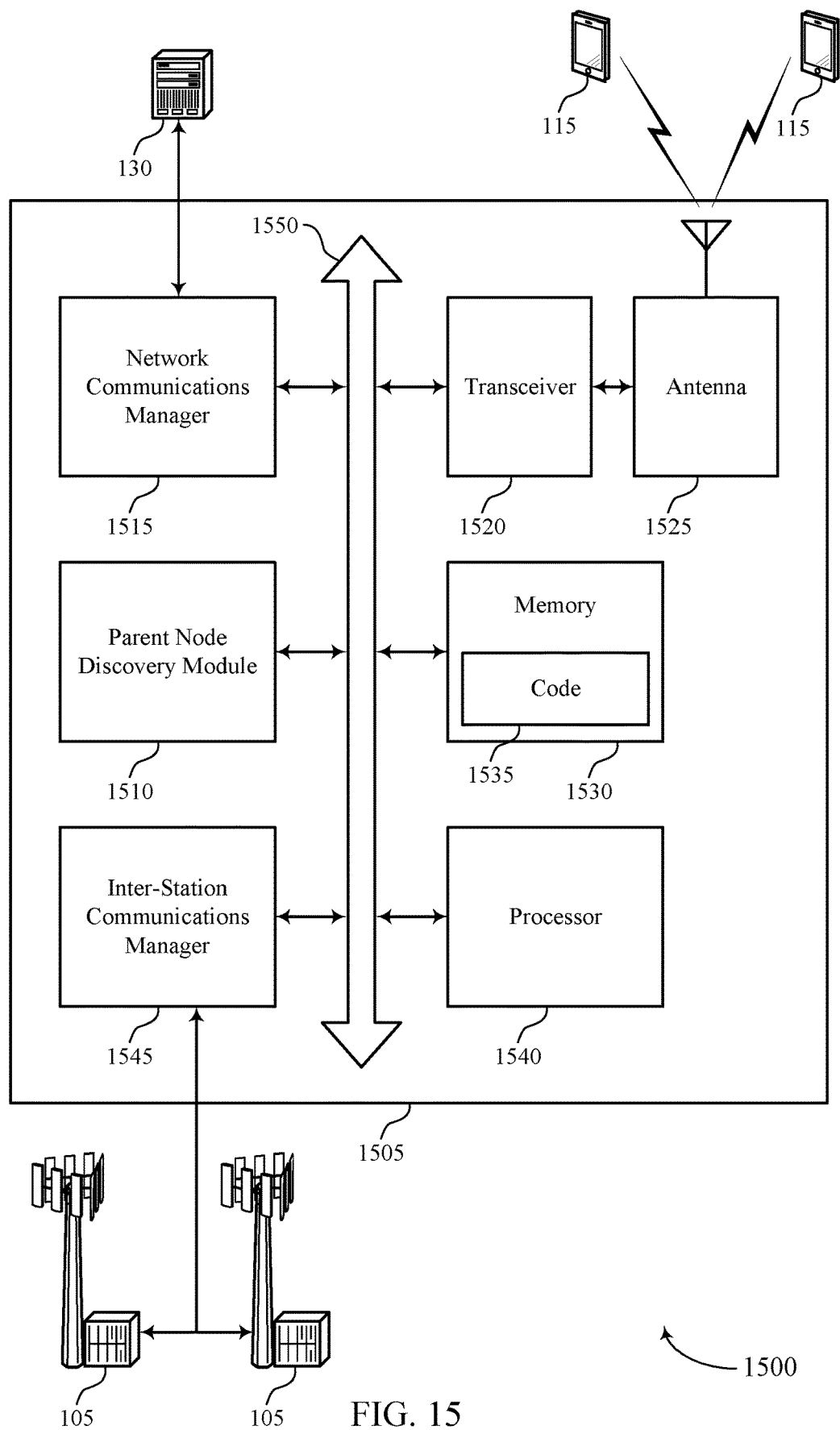
FIG. 15 shows a diagram of a system including a device that supports organization of inter-relay DRSs in accordance with aspects of the present disclosure.

FIG. 15 shows a diagram of a system 1500 including a device 1505 that supports organization of inter-relay DRSs in accordance with aspects of the present disclosure. The device 1505 may be an example of or include the components of device 1205, device 1305, a base station 105, or a parent node (e.g., an anchor or relay node) as described herein. The device 1505 may include components for bi-directional voice and data communications including components for transmitting and receiving communications, including a discovery module 1510, a network communications manager 1515, a transceiver 1520, an antenna 1525, memory 1530, a processor 1540, and an inter-station communications manager 1545. These components may be in electronic communication via one or more buses (e.g., bus 1550).

The discovery module 1510 may receive, from a relay node of the wireless communications system, a report indicating a duplexing capability of the relay node, determine DRS transmission resources and DRS measurement resources for the relay node based on the indicated duplexing capability of the relay node, and transmit, to the relay node, a configuration that identifies the determined DRS transmission resources and the determined DRS measurement resources.

The network communications manager 1515 may manage communications with the core network 130 (e.g., via one or more wired or wireless backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting organization of inter-relay discovery reference signals).

The inter-station communications manager 1545 may manage communications with other base station 105 and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
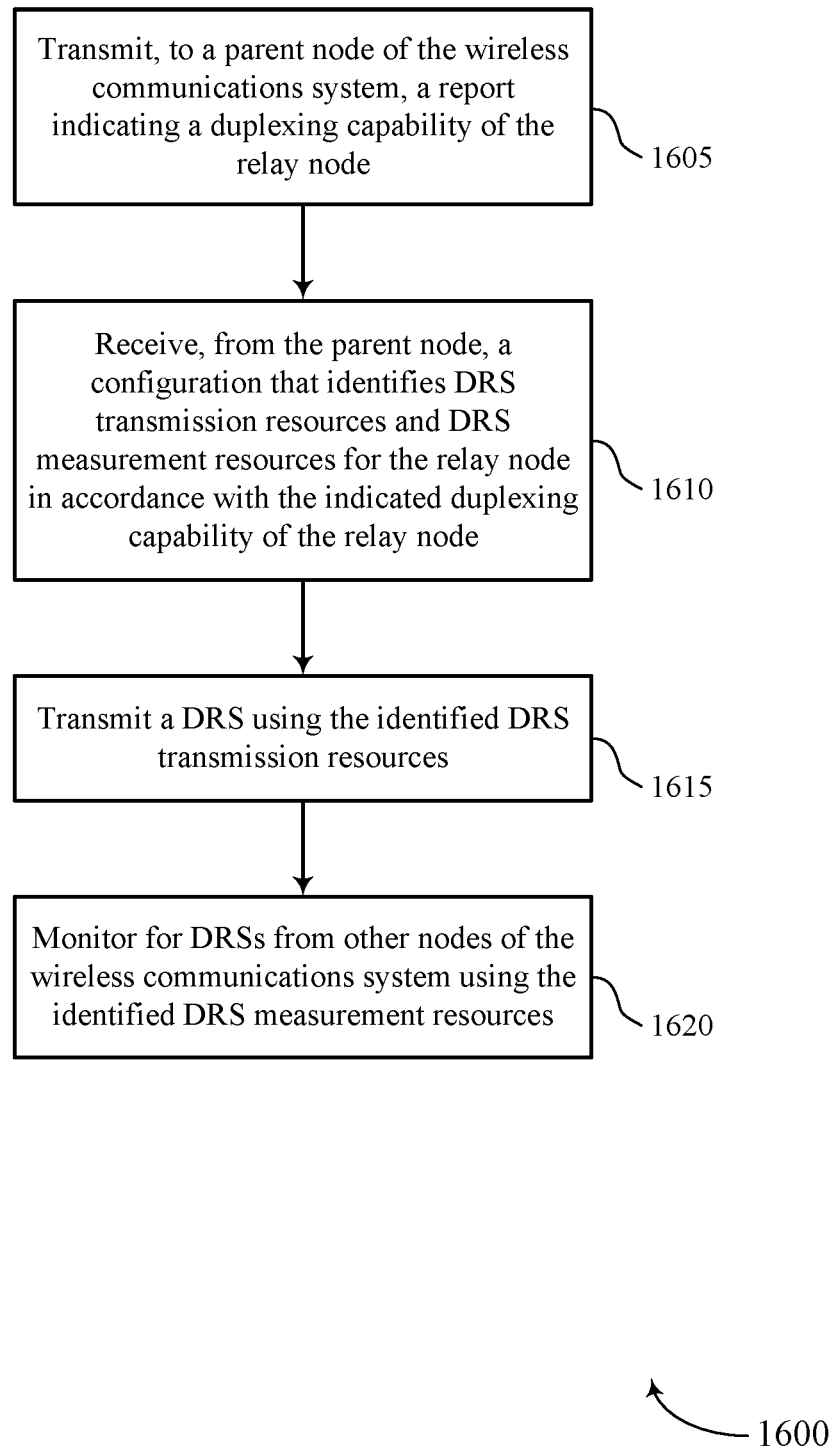
FIGS. 16 through 21 show flowcharts illustrating methods that support organization of inter-relay DRSs in accordance with aspects of the present disclosure.

FIG. 16 shows a flowchart illustrating a method 1600 that supports organization of inter-relay DRSs in accordance with aspects of the present disclosure. The operations of method 1600 may be implemented by a base station 105 (e.g., a relay node) or its components as described herein. For example, the operations of method 1600 may be performed by a discovery module as described with reference to FIGS. 8 through 11. In some examples, a relay node may execute a set of instructions to control the functional elements of the relay node to perform the functions described below. Additionally or alternatively, a relay node may perform aspects of the functions described below using special-purpose hardware.

At 1605, the relay node may transmit, to a parent node of the wireless communications system, a report indicating a duplexing capability of the relay node. The operations of 1605 may be performed according to the methods described herein. In some examples, aspects of the operations of 1605 may be performed by a reporting component as described with reference to FIGS. 8 through 11.

At 1610, the relay node may receive, from the parent node, a configuration that identifies DRS transmission resources and DRS measurement resources for the relay node in accordance with the indicated duplexing capability of the relay node. The operations of 1610 may be performed according to the methods described herein. In some examples, aspects of the operations of 1610 may be performed by a configuration component as described with reference to FIGS. 8 through 11.

At 1615, the relay node may transmit a DRS using the identified DRS transmission resources. The operations of 1615 may be performed according to the methods described herein. In some examples, aspects of the operations of 1615 may be performed by a DRS transmission component as described with reference to FIGS. 8 through 11.

At 1620, the relay node may monitor for DRSs from other nodes of the wireless communications system using the identified DRS measurement resources. The operations of 1620 may be performed according to the methods described herein. In some examples, aspects of the operations of 1620 may be performed by a DRS monitoring component as described with reference to FIGS. 8 through 11.

Figure 17:
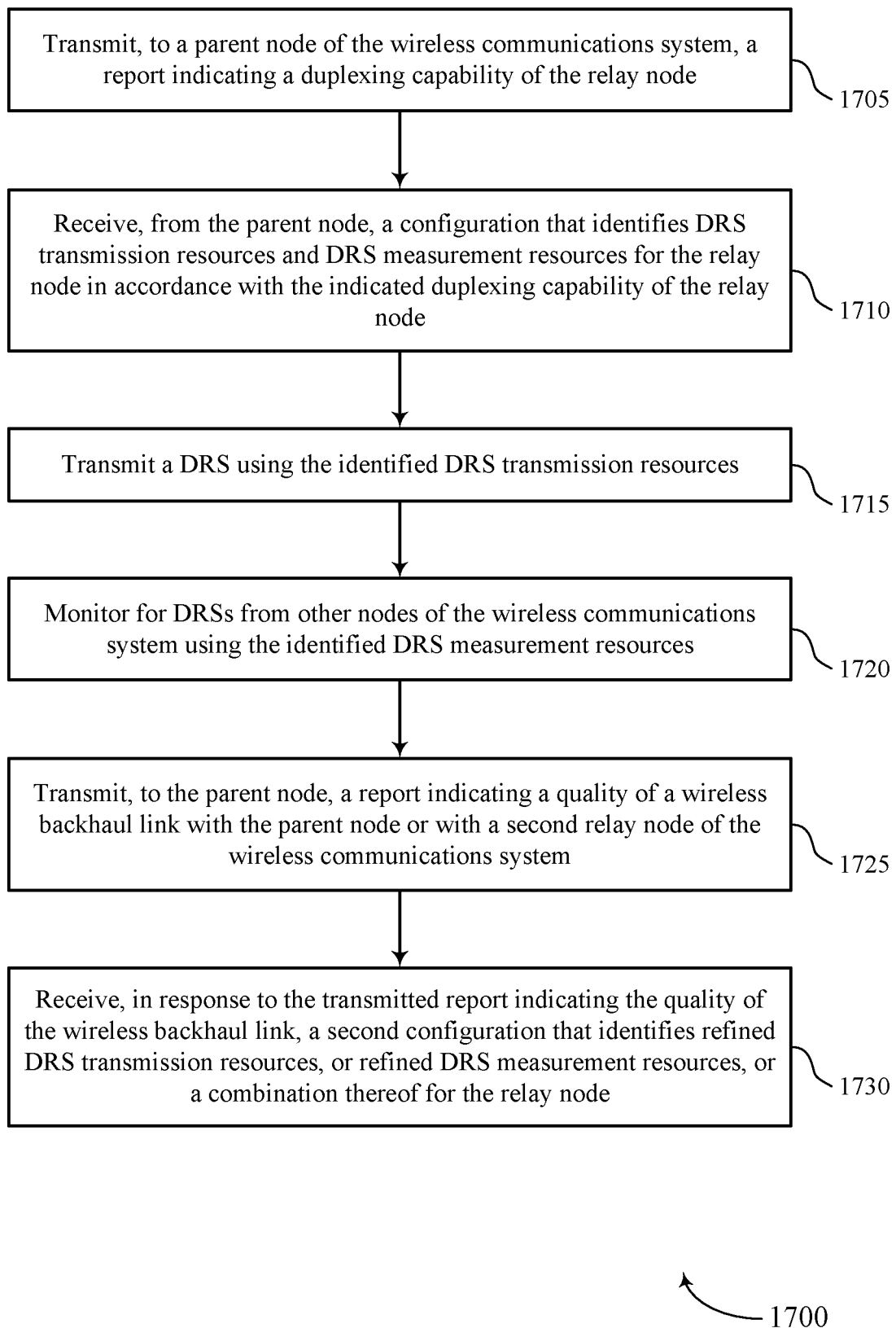

FIG. 17 shows a flowchart illustrating a method 1700 that supports organization of inter-relay DRSs in accordance with aspects of the present disclosure. The operations of method 1700 may be implemented by a base station 105 (e.g., a relay node) or its components as described herein. For example, the operations of method 1700 may be performed by a discovery module as described with reference to FIGS. 8 through 11. In some examples, a relay node may execute a set of instructions to control the functional elements of the relay node to perform the functions described below. Additionally or alternatively, a relay node may perform aspects of the functions described below using special-purpose hardware.

At 1705, the relay node may transmit, to a parent node of the wireless communications system, a report indicating a duplexing capability of the relay node. The operations of 1705 may be performed according to the methods described herein. In some examples, aspects of the operations of 1705 may be performed by a reporting component as described with reference to FIGS. 8 through 11.

At 1710, the relay node may receive, from the parent node, a configuration that identifies DRS transmission resources and DRS measurement resources for the relay node in accordance with the indicated duplexing capability of the relay node. The operations of 1710 may be performed according to the methods described herein. In some examples, aspects of the operations of 1710 may be performed by a configuration component as described with reference to FIGS. 8 through 11.

At 1715, the relay node may transmit a DRS using the identified DRS transmission resources. The operations of 1715 may be performed according to the methods described herein. In some examples, aspects of the operations of 1715 may be performed by a DRS transmission component as described with reference to FIGS. 8 through 11.

At 1720, the relay node may monitor for DRSs from other nodes of the wireless communications system using the identified DRS measurement resources. The operations of 1720 may be performed according to the methods described herein. In some examples, aspects of the operations of 1720 may be performed by a DRS monitoring component as described with reference to FIGS. 8 through 11.

At 1725, the relay node may transmit, to the parent node, a report indicating a quality of a wireless backhaul link with the parent node or with a second relay node of the wireless communications system. The operations of 1725 may be performed according to the methods described herein. In some examples, aspects of the operations of 1725 may be performed by a reporting component as described with reference to FIGS. 8 through 11.

At 1730, the relay node may receive, in response to the transmitted report indicating the quality of the wireless backhaul link, a second configuration that identifies refined DRS transmission resources, or refined DRS measurement resources, or a combination thereof for the relay node. The operations of 1730 may be performed according to the methods described herein. In some examples, aspects of the operations of 1730 may be performed by a configuration component as described with reference to FIGS. 8 through 11.

Figure 18:
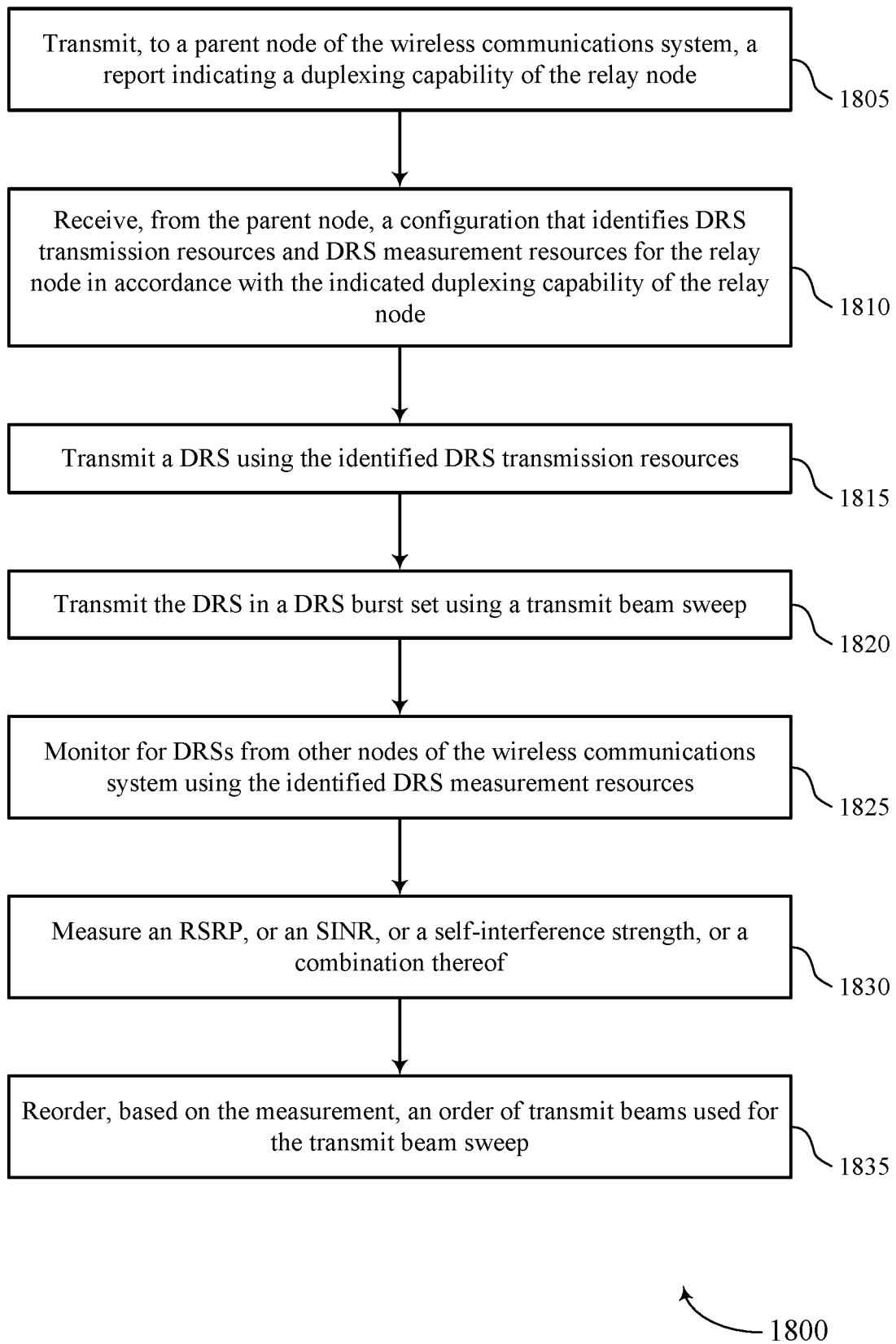

FIG. 18 shows a flowchart illustrating a method 1800 that supports organization of inter-relay DRSs in accordance with aspects of the present disclosure. The operations of method 1800 may be implemented by a base station 105 (e.g., a relay node) or its components as described herein. For example, the operations of method 1800 may be performed by a discovery module as described with reference to FIGS. 8 through 11. In some examples, a relay node may execute a set of instructions to control the functional elements of the relay node to perform the functions described below. Additionally or alternatively, a relay node may perform aspects of the functions described below using special-purpose hardware.

At 1805, the relay node may transmit, to a parent node of the wireless communications system, a report indicating a duplexing capability of the relay node. The operations of 1805 may be performed according to the methods described herein. In some examples, aspects of the operations of 1805 may be performed by a reporting component as described with reference to FIGS. 8 through 11.

At 1810, the relay node may receive, from the parent node, a configuration that identifies DRS transmission resources and DRS measurement resources for the relay node in accordance with the indicated duplexing capability of the relay node. The operations of 1810 may be performed according to the methods described herein. In some examples, aspects of the operations of 1810 may be performed by a configuration component as described with reference to FIGS. 8 through 11.

At 1815, the relay node may transmit a DRS using the identified DRS transmission resources. The operations of 1815 may be performed according to the methods described herein. In some examples, aspects of the operations of 1815 may be performed by a DRS transmission component as described with reference to FIGS. 8 through 11.

At 1820, the relay node may transmit the DRS in a DRS burst set using a transmit beam sweep. In some cases, step 1815 may be an aspect of step 1820. The operations of 1820 may be performed according to the methods described herein. In some examples, aspects of the operations of 1820 may be performed by a beam sweeping component as described with reference to FIGS. 8 through 11.

At 1825, the relay node may monitor for DRSs from other nodes of the wireless communications system using the identified DRS measurement resources. The operations of 1825 may be performed according to the methods described herein. In some examples, aspects of the operations of 1825 may be performed by a DRS monitoring component as described with reference to FIGS. 8 through 11.

At 1830, the relay node may measure an RSRP, or an SINR, or a self-interference strength, or a combination thereof. The operations of 1830 may be performed according to the methods described herein. In some examples, aspects of the operations of 1830 may be performed by a beam sweeping component as described with reference to FIGS. 8 through 11.

At 1835, the relay node may reorder, based on the measurement, an order of transmit beams used for the transmit beam sweep. The operations of 1835 may be performed according to the methods described herein. In some examples, aspects of the operations of 1835 may be performed by a beam sweeping component as described with reference to FIGS. 8 through 11.

Figure 19:
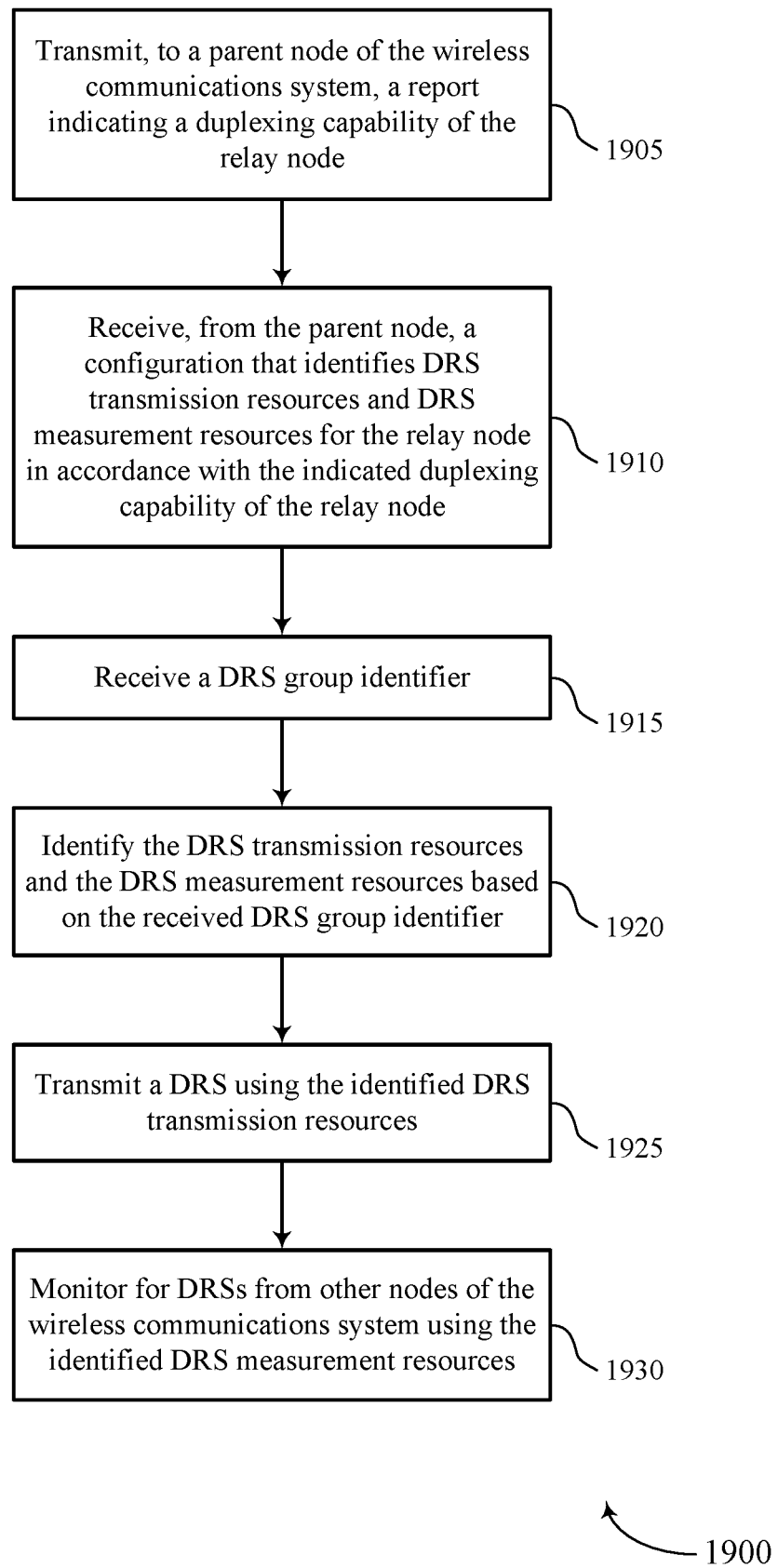

FIG. 19 shows a flowchart illustrating a method 1900 that supports organization of inter-relay DRSs in accordance with aspects of the present disclosure. The operations of method 1900 may be implemented by a base station 105 (e.g., a relay node) or its components as described herein. For example, the operations of method 1900 may be performed by a discovery module as described with reference to FIGS. 8 through 11. In some examples, a relay node may execute a set of instructions to control the functional elements of the relay node to perform the functions described below. Additionally or alternatively, a relay node may perform aspects of the functions described below using special-purpose hardware.

At 1905, the relay node may transmit, to a parent node of the wireless communications system, a report indicating a duplexing capability of the relay node. The operations of 1905 may be performed according to the methods described herein. In some examples, aspects of the operations of 1905 may be performed by a reporting component as described with reference to FIGS. 8 through 11.

At 1910, the relay node may receive, from the parent node, a configuration that identifies DRS transmission resources and DRS measurement resources for the relay node in accordance with the indicated duplexing capability of the relay node. The operations of 1910 may be performed according to the methods described herein. In some examples, aspects of the operations of 1910 may be performed by a configuration component as described with reference to FIGS. 8 through 11.

At 1915, the relay node may receive a DRS group identifier. In some cases, step 1915 may be an aspect of step 1910. The operations of 1915 may be performed according to the methods described herein. In some examples, aspects of the operations of 1915 may be performed by a DRS group identifier component as described with reference to FIGS. 8 through 11.

At 1920, the relay node may identify the DRS transmission resources and the DRS measurement resources based on the received DRS group identifier. The operations of 1920 may be performed according to the methods described herein. In some examples, aspects of the operations of 1920 may be performed by a DRS group identifier component as described with reference to FIGS. 8 through 11.

At 1925, the relay node may transmit a DRS using the identified DRS transmission resources. The operations of 1925 may be performed according to the methods described herein. In some examples, aspects of the operations of 1925 may be performed by a DRS transmission component as described with reference to FIGS. 8 through 11.

At 1930, the relay node may monitor for DRSs from other nodes of the wireless communications system using the identified DRS measurement resources. The operations of 1930 may be performed according to the methods described herein. In some examples, aspects of the operations of 1930 may be performed by a DRS monitoring component as described with reference to FIGS. 8 through 11.

Figure 20:
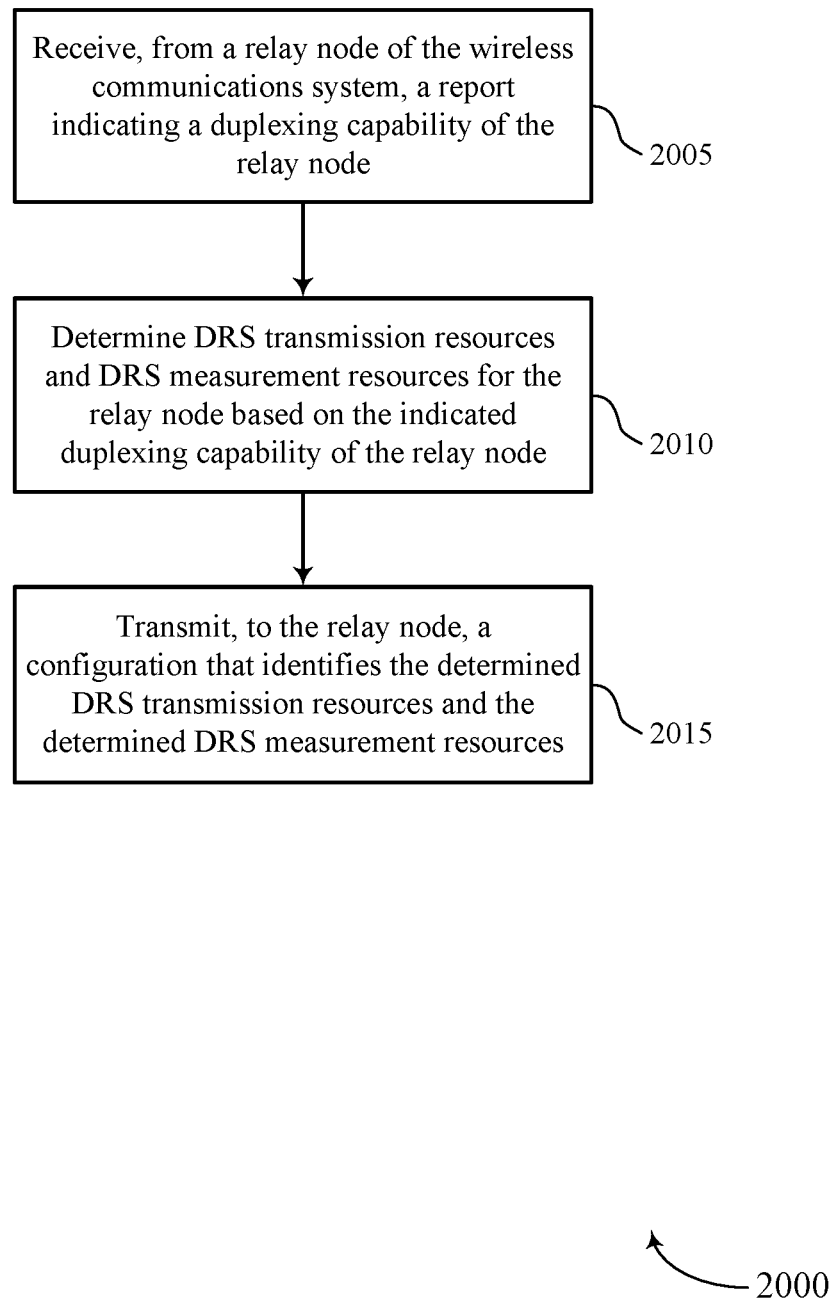

FIG. 20 shows a flowchart illustrating a method 2000 that supports organization of inter-relay DRSs in accordance with aspects of the present disclosure. The operations of method 2000 may be implemented by a base station 105 (e.g., a parent node) or its components as described herein. For example, the operations of method 2000 may be performed by a discovery module as described with reference to FIGS. 12 through 15. In some examples, a parent node may execute a set of instructions to control the functional elements of the parent node to perform the functions described below. Additionally or alternatively, a parent node may perform aspects of the functions described below using special-purpose hardware.

At 2005, the parent node may receive, from a relay node of the wireless communications system, a report indicating a duplexing capability of the relay node. The operations of 2005 may be performed according to the methods described herein. In some examples, aspects of the operations of 2005 may be performed by a report component as described with reference to FIGS. 12 through 15.

At 2010, the parent node may determine DRS transmission resources and DRS measurement resources for the relay node based on the indicated duplexing capability of the relay node. The operations of 2010 may be performed according to the methods described herein. In some examples, aspects of the operations of 2010 may be performed by a DRS resource determination component as described with reference to FIGS. 12 through 15.

At 2015, the parent node may transmit, to the relay node, a configuration that identifies the determined DRS transmission resources and the determined DRS measurement resources. The operations of 2015 may be performed according to the methods described herein. In some examples, aspects of the operations of 2015 may be performed by a configuration component as described with reference to FIGS. 12 through 15.

Figure 21:
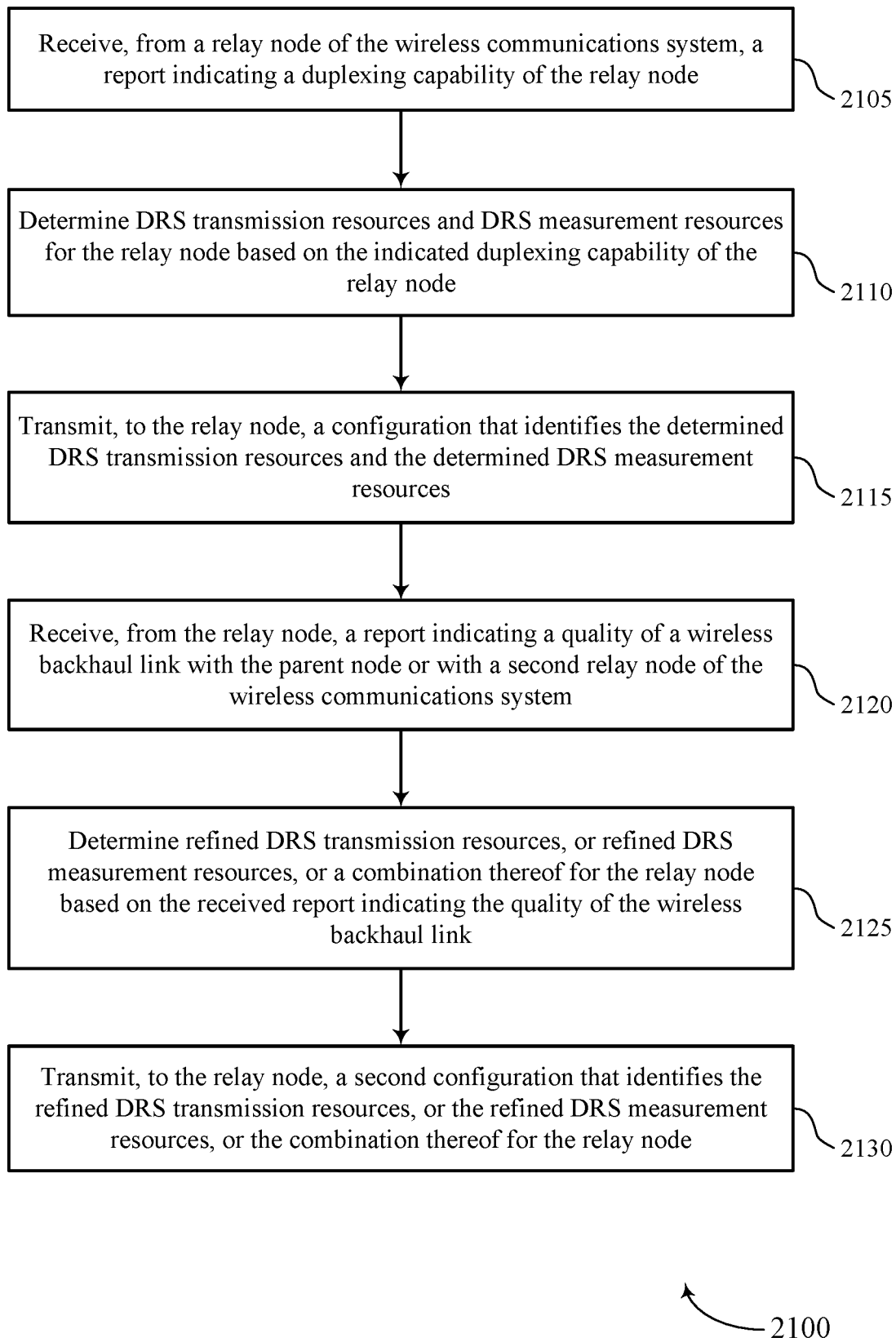

FIG. 21 shows a flowchart illustrating a method 2100 that supports organization of inter-relay DRSs in accordance with aspects of the present disclosure. The operations of method 2100 may be implemented by a base station 105 (e.g., a parent node) or its components as described herein. For example, the operations of method 2100 may be performed by a discovery module as described with reference to FIGS. 12 through 15. In some examples, a parent node may execute a set of instructions to control the functional elements of the parent node to perform the functions described below. Additionally or alternatively, a parent node may perform aspects of the functions described below using special-purpose hardware.

At 2105, the parent node may receive, from a relay node of the wireless communications system, a report indicating a duplexing capability of the relay node. The operations of 2105 may be performed according to the methods described herein. In some examples, aspects of the operations of 2105 may be performed by a report component as described with reference to FIGS. 12 through 15.

At 2110, the parent node may determine DRS transmission resources and DRS measurement resources for the relay node based on the indicated duplexing capability of the relay node. The operations of 2110 may be performed according to the methods described herein. In some examples, aspects of the operations of 2110 may be performed by a DRS resource determination component as described with reference to FIGS. 12 through 15.

At 2115, the parent node may transmit, to the relay node, a configuration that identifies the determined DRS transmission resources and the determined DRS measurement resources. The operations of 2115 may be performed according to the methods described herein. In some examples, aspects of the operations of 2115 may be performed by a configuration component as described with reference to FIGS. 12 through 15.

At 2120, the parent node may receive, from the relay node, a report indicating a quality of a wireless backhaul link with the parent node or with a second relay node of the wireless communications system. The operations of 2120 may be performed according to the methods described herein. In some examples, aspects of the operations of 2120 may be performed by a DRS resource refinement component as described with reference to FIGS. 12 through 15.

At 2125, the parent node may determine refined DRS transmission resources, or refined DRS measurement resources, or a combination thereof for the relay node based on the received report indicating the quality of the wireless backhaul link. The operations of 2125 may be performed according to the methods described herein. In some examples, aspects of the operations of 2125 may be performed by a DRS resource refinement component as described with reference to FIGS. 12 through 15.

At 2130, the parent node may transmit, to the relay node, a second configuration that identifies the refined DRS transmission resources, or the refined DRS measurement resources, or the combination thereof for the relay node. The operations of 2130 may be performed according to the methods described herein. In some examples, aspects of the operations of 2130 may be performed by a DRS resource refinement component as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a relay node of a wireless communications system, comprising:
   transmitting, to a parent node of the wireless communications system, a report indicating a duplexing capability of the relay node;
   receiving, from the parent node, a configuration that identifies discovery reference signal (DRS) transmission resources and DRS measurement resources for the relay node in accordance with the indicated duplexing capability of the relay node;
   transmitting a DRS using the identified DRS transmission resources; and
   monitoring for DRSs from other nodes of the wireless communications system using the identified DRS measurement resources.

2. The method of claim 1, wherein:
   the transmitted report indicates that the duplexing capability of the relay node comprises a full duplexing capability; and
   the DRS transmission resources for the relay node to use to transmit the DRS comprise a same transmission time interval as the DRS measurement resources for the relay node to use to monitor for the DRSs from other relay nodes of the wireless communications system.

3. The method of claim 1, wherein:
   the transmitted report indicates that the duplexing capability of the relay node comprises a half duplexing capability; and
   the DRS transmission resources for the relay node to use to transmit the DRS comprise a first transmission time interval and the DRS measurement resources for the relay node to use to monitor for the DRSs from other nodes comprise a second transmission time interval.

4. The method of claim 1, further comprising:
   transmitting, to the parent node, a report indicating a quality of a wireless backhaul link with the parent node or with a second relay node of the wireless communications system; and
   receiving, in response to the transmitted report indicating the quality of the wireless backhaul link, a second configuration that identifies refined DRS transmission resources, or refined DRS measurement resources, or a combination thereof for the relay node.

5. The method of claim 4, wherein the report indicating the quality of the wireless backhaul link is transmitted periodically, or semi-statically, or aperiodically, or in response to a trigger.

6. The method of claim 4, wherein the report indicating the quality of the wireless backhaul link indicates a reference signal received power (RSRP), or a signal to interference noise ratio (SINK), or a rank of the wireless backhaul link, or a self-interference strength, or a combination thereof.

7. The method of claim 1, wherein transmitting the report indicating the duplexing capability of the relay node comprises:
transmitting the report indicating a plurality of duplexing capabilities of the relay node, wherein the plurality of duplexing capabilities comprises at least the duplexing capability.

8. The method of claim 1, wherein transmitting the DRS using the identified DRS transmission resources comprises:
transmitting the DRS in a DRS burst set using a transmit beam sweep.

9. The method of claim 8, further comprising:
measuring a reference signal received power (RSRP), or a signal to interference noise ratio (SINR), or a self-interference strength, or a combination thereof; and
reordering, based at least in part on the measurement, an order of transmit beams used for the transmit beam sweep.

10. The method of claim 8, further comprising:
receiving, from the parent node, an indication of an order of transmit beams used for the transmit beam sweep.

11. The method of claim 1, wherein receiving the configuration that identifies DRS transmission resources and DRS measurement resources comprises:
receiving a DRS group identifier; and
identifying the DRS transmission resources and the DRS measurement resources based at least in part on the received DRS group identifier.

12. The method of claim 1, wherein receiving the configuration that identifies DRS transmission resources and DRS measurement resources comprises:
receiving the configuration via radio resource control signaling, or a medium access control (MAC) control element, or a combination thereof.

13. The method of claim 1, wherein:
the report indicating the duplexing capability of the relay node is transmitted during an initial integration procedure for the relay node that establishes a wireless backhaul link with the parent node or after the wireless backhaul link with the parent node is established; and
the report indicating the duplexing capability of the relay node further comprises a level of self-interference cancellation for the relay node.

14. The method of claim 1, wherein the DRS comprises at least a portion of a synchronization signal block, or a channel state information reference signal, or a tracking reference signal.

15. A method for wireless communication at a parent node of a wireless communications system, comprising:
receiving, from a relay node of the wireless communications system, a report indicating a duplexing capability of the relay node;
determining discovery reference signal (DRS) transmission resources and DRS measurement resources for the relay node based at least in part on the indicated duplexing capability of the relay node; and
transmitting, to the relay node, a configuration that identifies the determined DRS transmission resources and the determined DRS measurement resources.

16. The method of claim 15, wherein determining the DRS transmission resources and the DRS measurement resources comprises:
identifying that the received report indicates that the duplexing capability of the relay node is a full duplexing capability; and
determining the DRS transmission resources for the relay node to use to transmit a DRS comprise a same transmission time interval as the DRS measurement resources for the relay node to use to monitor for DRSs from other relay nodes.

17. The method of claim 15, wherein determining the DRS transmission resources and the DRS measurement resources comprises:
identifying that the received report indicates that the duplexing capability of the relay node is a half duplexing capability; and
determining the DRS transmission resources for the relay node to use to transmit the DRS comprise a first transmission time interval and the DRS measurement resources for the relay node to use to monitor for the DRSs from other nodes comprise a second transmission time interval.

18. The method of claim 15, further comprising:
receiving, from the relay node, a report indicating a quality of a wireless backhaul link with the parent node or with a second relay node of the wireless communications system;
determining refined DRS transmission resources, or refined DRS measurement resources, or a combination thereof for the relay node based at least in part on the received report indicating the quality of the wireless backhaul link; and
transmitting, to the relay node, a second configuration that identifies the refined DRS transmission resources, or the refined DRS measurement resources, or the combination thereof for the relay node.

19. The method of claim 18, wherein the report indicating the quality of the wireless backhaul link is transmitted periodically, or semi-statically, or aperiodically, or in response to a trigger.

20. The method of claim 18, wherein the report indicating the quality of the wireless backhaul link indicates a reference signal received power (RSRP), or a signal to interference noise ratio (SINK), or a rank of the wireless backhaul link, or a self-interference strength, or a combination thereof.

21. The method of claim 15, further comprising:
transmitting, to the relay node, an indication of an order of transmit beams for the relay node to use to transmit a DRS burst set using a transmit beam sweep.

22. The method of claim 15, further comprising:
assigning the relay node to a DRS group that includes a first set of relay nodes, wherein the determined DRS transmission resources and the determined DRS measurement resources are common to the first set of relay nodes.

23. The method of claim 22, wherein transmitting the configuration that identifies the determined DRS transmission resources and the determined DRS measurement resources comprises:

transmitting a DRS group identifier for the DRS group that identifies the determined DRS transmission resources and the determined DRS measurement resources.

24. The method of claim 22, further comprising:
assigning a second relay node to a second DRS group that includes a second set of relay nodes; and
determining second DRS transmission resources and second DRS measurement resources for the second set of relay nodes different from the determined DRS transmission resources, or the determined DRS measurement resources, or a combination thereof for the first set of relay nodes.

25. The method of claim 22, wherein the relay node is assigned to the DRS group based at least in part on the duplexing capability of the relay node, or a location of the relay node, or a level of interference between the relay node and a second relay node, or a self-interference strength of the relay node, or a combination thereof.

26. The method of claim 22, wherein at least two of the relay nodes of the DRS group have different control resources, or data resources, or a combination thereof.

27. The method of claim 15, wherein transmitting the configuration that identifies the determined DRS transmission resources and the determined DRS measurement resources comprises:
transmitting the configuration via radio resource control signaling, or a medium access control (MAC) control element, or a combination thereof.

28. The method of claim 15, wherein:
the report indicating the duplexing capability of the relay node is received during an initial integration procedure for the relay node that establishes a wireless backhaul link with the parent node or after the wireless backhaul link with the parent node is established; and
the report indicating the duplexing capability of the relay node further comprises a level of self-interference cancellation for the relay node.

29. An apparatus for wireless communication at a relay node of a wireless communications system, comprising:
a processor;
memory coupled with the processor; and
instructions stored in the memory and operable, when executed by the processor, to cause the apparatus to:
transmit, to a parent node of the wireless communications system, a report indicating a duplexing capability of the relay node;
receive, from the parent node, a configuration that identifies discovery reference signal (DRS) transmission resources and DRS measurement resources for the relay node in accordance with the indicated duplexing capability of the relay node;
transmit a DRS using the identified DRS transmission resources; and
monitor for DRSs from other nodes of the wireless communications system using the identified DRS measurement resources.

30. An apparatus for wireless communication at a parent node of a wireless communications system, comprising:
a processor;
memory coupled with the processor; and
instructions stored in the memory and operable, when executed by the processor, to cause the apparatus to:
receive, from a relay node of the wireless communications system, a report indicating a duplexing capability of the relay node;
determine discovery reference signal (DRS) transmission resources and DRS measurement resources for the relay node based at least in part on the indicated duplexing capability of the relay node; and
transmit, to the relay node, a configuration that identifies the determined DRS transmission resources and the determined DRS measurement resources.

* * * * *